United States Patent
Fitzgibbon et al.

(10) Patent No.: US 8,213,680 B2
(45) Date of Patent: Jul. 3, 2012

(54) PROXY TRAINING DATA FOR HUMAN BODY TRACKING

(75) Inventors: Andrew Fitzgibbon, Cambridge (GB); Jamie Shotton, Cambridge (GB); Mat Cook, Cambridge (GB); Richard Moore, Redmond, WA (US); Mark Finnochio, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 329 days.

(21) Appl. No.: 12/727,787

(22) Filed: Mar. 19, 2010

(65) Prior Publication Data

US 2011/0228976 A1 Sep. 22, 2011

(51) Int. Cl.
*G06K 9/00* (2006.01)
*H04N 5/225* (2006.01)

(52) U.S. Cl. ........................ 382/103; 348/169

(58) Field of Classification Search .................. 382/103, 382/107, 155, 157, 159, 236; 348/154, 155, 348/169, 170, 171, 172, 208.1, 208.14, 352; 345/156; 706/12, 904, 912; 715/862
See application file for complete search history.

(56) References Cited

U.S. PATENT DOCUMENTS

| | | | |
|---|---|---|---|
| 4,627,620 A | 12/1986 | Yang | |
| 4,630,910 A | 12/1986 | Ross et al. | |
| 4,645,458 A | 2/1987 | Williams | |
| 4,695,953 A | 9/1987 | Blair et al. | |
| 4,702,475 A | 10/1987 | Elstein et al. | |
| 4,711,543 A | 12/1987 | Blair et al. | |
| 4,751,642 A | 6/1988 | Silva et al. | |
| 4,796,997 A | 1/1989 | Svetkoff et al. | |
| 4,809,065 A | 2/1989 | Harris et al. | |
| 4,817,950 A | 4/1989 | Goo | |
| 4,843,568 A | 6/1989 | Krueger et al. | |
| 4,893,183 A | 1/1990 | Nayar | |
| 4,901,362 A | 2/1990 | Terzian | |
| 4,925,189 A | 5/1990 | Braeunig | |

(Continued)

FOREIGN PATENT DOCUMENTS

CN 101254344 B 6/2010

(Continued)

OTHER PUBLICATIONS

Shivappa, et al., "Person Tracking With Audio-visual Cues Using The Iterative Decoding Framework," IEEE 5th International Conference on Advanced Video and Signal Based Surveillance, 2008, pp. 260-267.

(Continued)

*Primary Examiner* — Abolfazl Tabatabai
(74) *Attorney, Agent, or Firm* — Vierra Magen Marcus & DeNiro LLP

(57) ABSTRACT

Synthesized body images are generated for a machine learning algorithm of a body joint tracking system. Frames from motion capture sequences are retargeted to several different body types, to leverage the motion capture sequences. To avoid providing redundant or similar frames to the machine learning algorithm, and to provide a compact yet highly variegated set of images, dissimilar frames can be identified using a similarity metric. The similarity metric is used to locate frames which are sufficiently distinct, according to a threshold distance. For realism, noise is added to the depth images based on noise sources which a real world depth camera would often experience. Other random variations can be introduced as well. For example, a degree of randomness can be added to retargeting. For each frame, the depth image and a corresponding classification image, with labeled body parts, are provided. 3-D scene elements can also be provided.

20 Claims, 17 Drawing Sheets

U.S. PATENT DOCUMENTS

| | | |
|---|---|---|
| 5,101,444 A | 3/1992 | Wilson et al. |
| 5,148,154 A | 9/1992 | MacKay et al. |
| 5,184,295 A | 2/1993 | Mann |
| 5,229,754 A | 7/1993 | Aoki et al. |
| 5,229,756 A | 7/1993 | Kosugi et al. |
| 5,239,463 A | 8/1993 | Blair et al. |
| 5,239,464 A | 8/1993 | Blair et al. |
| 5,288,078 A | 2/1994 | Capper et al. |
| 5,295,491 A | 3/1994 | Gevins |
| 5,320,538 A | 6/1994 | Baum |
| 5,347,306 A | 9/1994 | Nitta |
| 5,385,519 A | 1/1995 | Hsu et al. |
| 5,405,152 A | 4/1995 | Katanics et al. |
| 5,417,210 A | 5/1995 | Funda et al. |
| 5,423,554 A | 6/1995 | Davis |
| 5,454,043 A | 9/1995 | Freeman |
| 5,469,740 A | 11/1995 | French et al. |
| 5,495,576 A | 2/1996 | Ritchey |
| 5,516,105 A | 5/1996 | Eisenbrey et al. |
| 5,524,637 A | 6/1996 | Erickson |
| 5,534,917 A | 7/1996 | MacDougall |
| 5,563,988 A | 10/1996 | Maes et al. |
| 5,577,981 A | 11/1996 | Jarvik |
| 5,580,249 A | 12/1996 | Jacobsen et al. |
| 5,594,469 A | 1/1997 | Freeman et al. |
| 5,597,309 A | 1/1997 | Riess |
| 5,616,078 A | 4/1997 | Oh |
| 5,617,312 A | 4/1997 | Iura et al. |
| 5,638,300 A | 6/1997 | Johnson |
| 5,641,288 A | 6/1997 | Zaenglein |
| 5,682,196 A | 10/1997 | Freeman |
| 5,682,229 A | 10/1997 | Wangler |
| 5,690,582 A | 11/1997 | Ulrich et al. |
| 5,703,367 A | 12/1997 | Hashimoto et al. |
| 5,704,837 A | 1/1998 | Iwasaki et al. |
| 5,715,834 A | 2/1998 | Bergamasco et al. |
| 5,875,108 A | 2/1999 | Hoffberg et al. |
| 5,877,803 A | 3/1999 | Wee et al. |
| 5,913,727 A | 6/1999 | Ahdoot |
| 5,933,125 A | 8/1999 | Fernie |
| 5,980,256 A | 11/1999 | Carmein |
| 5,989,157 A | 11/1999 | Walton |
| 5,995,649 A | 11/1999 | Marugame |
| 6,005,548 A | 12/1999 | Latypov et al. |
| 6,009,210 A | 12/1999 | Kang |
| 6,054,991 A | 4/2000 | Crane et al. |
| 6,066,075 A | 5/2000 | Poulton |
| 6,072,494 A | 6/2000 | Nguyen |
| 6,073,489 A | 6/2000 | French et al. |
| 6,077,201 A | 6/2000 | Cheng et al. |
| 6,098,458 A | 8/2000 | French et al. |
| 6,100,896 A | 8/2000 | Strohecker et al. |
| 6,101,289 A | 8/2000 | Kellner |
| 6,128,003 A | 10/2000 | Smith et al. |
| 6,130,677 A | 10/2000 | Kunz |
| 6,141,463 A | 10/2000 | Covell et al. |
| 6,147,678 A | 11/2000 | Kumar et al. |
| 6,152,856 A | 11/2000 | Studor et al. |
| 6,159,100 A | 12/2000 | Smith |
| 6,173,066 B1 | 1/2001 | Peurach et al. |
| 6,181,343 B1 | 1/2001 | Lyons |
| 6,188,777 B1 | 2/2001 | Darrell et al. |
| 6,215,890 B1 | 4/2001 | Matsuo et al. |
| 6,215,898 B1 | 4/2001 | Woodfill et al. |
| 6,226,396 B1 | 5/2001 | Marugame |
| 6,229,913 B1 | 5/2001 | Nayar et al. |
| 6,256,033 B1 | 7/2001 | Nguyen |
| 6,256,400 B1 | 7/2001 | Takata et al. |
| 6,283,860 B1 | 9/2001 | Lyons et al. |
| 6,289,112 B1 | 9/2001 | Jain et al. |
| 6,299,308 B1 | 10/2001 | Voronka et al. |
| 6,308,565 B1 | 10/2001 | French et al. |
| 6,316,934 B1 | 11/2001 | Amorai-Moriya et al. |
| 6,363,160 B1 | 3/2002 | Bradski et al. |
| 6,384,819 B1 | 5/2002 | Hunter |
| 6,411,744 B1 | 6/2002 | Edwards |
| 6,430,997 B1 | 8/2002 | French et al. |
| 6,476,834 B1 | 11/2002 | Doval et al. |
| 6,496,598 B1 | 12/2002 | Harman |
| 6,503,195 B1 | 1/2003 | Keller et al. |
| 6,539,931 B2 | 4/2003 | Trajkovic et al. |
| 6,570,555 B1 | 5/2003 | Prevost et al. |
| 6,633,294 B1 | 10/2003 | Rosenthal et al. |
| 6,640,202 B1 | 10/2003 | Dietz et al. |
| 6,661,918 B1 | 12/2003 | Gordon et al. |
| 6,674,877 B1 * | 1/2004 | Jojic et al. .................. 382/103 |
| 6,681,031 B2 | 1/2004 | Cohen et al. |
| 6,714,665 B1 | 3/2004 | Hanna et al. |
| 6,731,799 B1 | 5/2004 | Sun et al. |
| 6,738,066 B1 | 5/2004 | Nguyen |
| 6,765,726 B2 | 7/2004 | French et al. |
| 6,788,809 B1 | 9/2004 | Grzeszczuk et al. |
| 6,801,637 B2 | 10/2004 | Voronka et al. |
| 6,873,723 B1 | 3/2005 | Aucsmith et al. |
| 6,876,496 B2 | 4/2005 | French et al. |
| 6,937,742 B2 | 8/2005 | Roberts et al. |
| 6,950,534 B2 | 9/2005 | Cohen et al. |
| 6,999,601 B2 * | 2/2006 | Pavlovic et al. ............. 382/103 |
| 7,003,134 B1 | 2/2006 | Covell et al. |
| 7,036,094 B1 | 4/2006 | Cohen et al. |
| 7,038,855 B2 | 5/2006 | French et al. |
| 7,039,676 B1 | 5/2006 | Day et al. |
| 7,042,440 B2 | 5/2006 | Pryor et al. |
| 7,050,606 B2 | 5/2006 | Paul et al. |
| 7,058,204 B2 | 6/2006 | Hildreth et al. |
| 7,060,957 B2 | 6/2006 | Lange et al. |
| 7,113,918 B1 | 9/2006 | Ahmad et al. |
| 7,121,946 B2 | 10/2006 | Paul et al. |
| 7,170,492 B2 | 1/2007 | Bell |
| 7,184,048 B2 | 2/2007 | Hunter |
| 7,202,898 B1 | 4/2007 | Braun et al. |
| 7,212,665 B2 * | 5/2007 | Yang et al .................. 382/159 |
| 7,222,078 B2 | 5/2007 | Abelow |
| 7,227,526 B2 | 6/2007 | Hildreth et al. |
| 7,259,747 B2 | 8/2007 | Bell |
| 7,308,112 B2 | 12/2007 | Fujimura et al. |
| 7,317,836 B2 * | 1/2008 | Fujimura et al. ............. 382/203 |
| 7,348,963 B2 | 3/2008 | Bell |
| 7,359,121 B2 | 4/2008 | French et al. |
| 7,367,887 B2 | 5/2008 | Watabe et al. |
| 7,379,563 B2 | 5/2008 | Shamaie |
| 7,379,566 B2 | 5/2008 | Hildreth |
| 7,389,591 B2 | 6/2008 | Jaiswal et al. |
| 7,412,077 B2 | 8/2008 | Li et al. |
| 7,421,093 B2 | 9/2008 | Hildreth et al. |
| 7,430,312 B2 | 9/2008 | Gu |
| 7,436,496 B2 | 10/2008 | Kawahito |
| 7,450,736 B2 | 11/2008 | Yang et al. |
| 7,452,275 B2 | 11/2008 | Kuraishi |
| 7,460,690 B2 | 12/2008 | Cohen et al. |
| 7,489,812 B2 | 2/2009 | Fox et al. |
| 7,536,032 B2 | 5/2009 | Bell |
| 7,555,142 B2 | 6/2009 | Hildreth et al. |
| 7,560,701 B2 | 7/2009 | Oggier et al. |
| 7,570,805 B2 | 8/2009 | Gu |
| 7,574,020 B2 | 8/2009 | Shamaie |
| 7,576,727 B2 | 8/2009 | Bell |
| 7,590,262 B2 | 9/2009 | Fujimura et al. |
| 7,593,552 B2 | 9/2009 | Higaki et al. |
| 7,598,942 B2 | 10/2009 | Underkoffler et al. |
| 7,607,509 B2 | 10/2009 | Schmiz et al. |
| 7,620,202 B2 | 11/2009 | Fujimura et al. |
| 7,668,340 B2 | 2/2010 | Cohen et al. |
| 7,680,298 B2 | 3/2010 | Roberts et al. |
| 7,683,954 B2 | 3/2010 | Ichikawa et al. |
| 7,684,592 B2 | 3/2010 | Paul et al. |
| 7,701,439 B2 | 4/2010 | Hillis et al. |
| 7,702,130 B2 | 4/2010 | Im et al. |
| 7,704,135 B2 | 4/2010 | Harrison, Jr. |
| 7,710,391 B2 | 5/2010 | Bell et al. |
| 7,729,530 B2 | 6/2010 | Antonov et al. |
| 7,746,345 B2 | 6/2010 | Hunter |
| 7,760,182 B2 | 7/2010 | Ahmad et al. |
| 7,809,167 B2 | 10/2010 | Bell |
| 7,834,846 B1 | 11/2010 | Bell |
| 7,852,262 B2 | 12/2010 | Namineni et al. |
| RE42,256 E | 3/2011 | Edwards |

| | | | |
|---|---|---|---|
| 7,898,522 | B2 | 3/2011 | Hildreth et al. |
| 8,035,612 | B2 | 10/2011 | Bell et al. |
| 8,035,614 | B2 | 10/2011 | Bell et al. |
| 8,035,624 | B2 | 10/2011 | Bell et al. |
| 8,072,470 | B2 | 12/2011 | Marks |
| 2007/0098254 | A1 | 5/2007 | Yang et al. |
| 2008/0026838 | A1 | 1/2008 | Dunstan et al. |
| 2008/0152191 | A1 | 6/2008 | Fujimura et al. |
| 2008/0152218 | A1 | 6/2008 | Okada |
| 2009/0141933 | A1 | 6/2009 | Wagg |
| 2009/0154796 | A1 | 6/2009 | Gupta et al. |
| 2009/0175540 | A1 | 7/2009 | Dariush et al. |
| 2009/0221368 | A1 | 9/2009 | Yen et al. |

FOREIGN PATENT DOCUMENTS

| | | |
|---|---|---|
| EP | 0583061 A2 | 2/1994 |
| JP | 08044490 A1 | 2/1996 |
| WO | 93/10708 A1 | 6/1993 |
| WO | 97/17598 A1 | 5/1997 |
| WO | 99/44698 A1 | 9/1999 |
| WO | WO2009059065 | 5/2009 |

OTHER PUBLICATIONS

Toyama, et al., "Probabilistic Tracking in a Metric Space," Eighth International Conference on Computer Vision, Vancouver, Canada, vol. 2, Jul. 2001, 8 pages.

Kuchinskas, "Binary Body Double: Microsoft Reveals the Science Behind Project Natal for Xbox 360", Online Website, Scientific American, Jan. 7, 2010, 3 pages, http://www.scientificamerican.com/article.cfm?id=microsoft-project-natal.

Okada, "Relevant Feature Selection for Human Pose Estimation and Localization in Cluttered Images", ECCV 2008, Part II, Oct. 2008, LNCS 5303, pp. 434-445, Springer-Verlag Berlin Heidelberg.

Ivekovic, "Human Body Pose Estimation with Particle Swarm Optimisation", Evolutionary Computation, Dec. 2008, pp. 509-528, vol. 16, Issue 4, MIT Press, Cambridge, MA, USA.

Jaeggli, "Learning Generative Models for Monocular Body Pose Estimation", Asian Conference on Computer Vision (ACCV), Nov. 2007, 10 pages.

"Research on Marker-less Human Body Motion Capture and Pose Estimation", Online Website, Dec. 7, 2009, http://www.latest-science-articles.com/IT/Research-on-Marker-less-Human-Body-Motion-Capture-and-Pose-Estimation-1502.html.

Hahn, "Spatio-temporal 3D Pose Estimation and Tracking of Human Body Parts using the Shape Flow Algorithm", The 19th International Conference on Pattern Recognition (ICPR), Dec. 2008, pp. 1-4.

Kanade et al., "A Stereo Machine for Video-rate Dense Depth Mapping and Its New Applications", IEEE Computer Society Conference on Computer Vision and Pattern Recognition, 1996, pp. 196-202, The Robotics Institute, Carnegie Mellon University, Pittsburgh, PA.

Miyagawa et al., "CCD-Based Range Finding Sensor", Oct. 1997, pp. 1648-1652, vol. 44 No. 10, IEEE Transactions on Electron Devices.

Rosenhahn et al., "Automatic Human Model Generation", 2005, pp. 41-48, University of Auckland (CITR), New Zealand.

Aggarwal et al., "Human Motion Analysis: A Review", IEEE Nonrigid and Articulated Motion Workshop, 1997, University of Texas at Austin, Austin, TX.

Shao et al., "An Open System Architecture for a Multimedia and Multimodal User Interface", Aug. 24, 1998, Japanese Society for Rehabilitation of Persons with Disabilities (JSRPD), Japan.

Kohler, "Special Topics of Gesture Recognition Applied in Intelligent Home Environments", In Proceedings of the Gesture Workshop, 1998, pp. 285-296, Germany.

Kohler, "Vision Based Remote Control in Intelligent Home Environments", University of Erlangen-Nuremberg/Germany, 1996, pp. 147-154, Germany.

Kohler, "Technical Details and Ergonomical Aspects of Gesture Recognition applied in Intelligent Home Environments", 1997, Germany.

Hasegawa et al., "Human-Scale Haptic Interaction with a Reactive Virtual Human in a Real-Time Physics Simulator", Jul. 2006, vol. 4, No. 3, Article 6C, ACM Computers in Entertainment, New York, NY.

Qian et al., "A Gesture-Driven Multimodal Interactive Dance System", Jun. 2004, pp. 1579-1582, IEEE International Conference on Multimedia and Expo (ICME), Taipei, Taiwan.

Zhao, "Dressed Human Modeling, Detection, and Parts Localization", 2001, The Robotics Institute, Carnegie Mellon University, Pittsburgh, PA.

He, "Generation of Human Body Models", Apr. 2005, University of Auckland, New Zealand.

Isard et al., "Condensation—Conditional Density Propagation for Visual Tracking", 1998, pp. 5-28, International Journal of Computer Vision 29(1), Netherlands.

Livingston, "Vision-based Tracking with Dynamic Structured L ght for Video See-through Augmented Reality", 1998, University of North Carolina at Chapel Hill, North Carolina, USA.

Wren et al., "Pfinder: Real-Time Tracking of the Human Body", MIT Media Laboratory Perceptual Computing Section Technical Report No. 353, Jul. 1997, vol. 19, No. 7, pp. 780-785, IEEE Transactions on Pattern Analysis and Machine Intelligence, Caimbridge, MA.

Breen et al., "Interactive Occlusion and Collision of Real and Virtual Objects in Augmented Reality", Technical Report ECRC-95-02, 1995, European Computer-Industry Research Center GmbH, Munich, Germany.

Freeman et al., "Television Control by Hand Gestures", Dec. 1994, Mitsubishi Electric Research Laboratories, TR94-24, Caimbridge, MA.

Hongo et al., "Focus of Attention for Face and Hand Gesture Recognition Using Multiple Cameras", Mar. 2000, pp. 156-161, 4th IEEE International Conference on Automatic Face and Gesture Recognition, Grenoble, France.

Pavlovic et al., "Visual Interpretation of Hand Gestures for Human-Computer Interaction: A Review", Jul. 1997, pp. 677-695, vol. 19, No. 7, IEEE Transactions on Pattern Analysis and Machine Intelligence.

Azarbayejani et al., "Visually Controlled Graphics", Jun. 1993, vol. 15, No. 6, IEEE Transactions on Pattern Analysis and Machine Intelligence.

Granieri et al., "Simulating Humans in VR", The British Computer Society, Oct. 1994, Academic Press.

Brogan et al., "Dynamically Simulated Characters in Virtual Environments", Sep./Oct. 1998, pp. 2-13, vol. 18, Issue 5, IEEE Computer Graphics and Applications.

Fisher et al., "Virtual Environment Display System", ACM Workshop on Interactive 3D Graphics, Oct. 1986, Chapel Hill, NC.

"Virtual High Anxiety", Tech Update, Aug. 1995, pp. 22.

Sheridan et al., "Virtual Reality Check", Technology Review, Oct. 1993, pp. 22-28, vol. 96, No. 7.

Stevens, "Flights into Virtual Reality Treating Real World Disorders", The Washington Post, Mar. 27, 1995, Science Psychology, 2 pages.

"Simulation and Training", 1994, Division Incorporated.

English Machine-translation of Japanese Publication No. JP08-044490 published on Feb. 16, 1996.

* cited by examiner

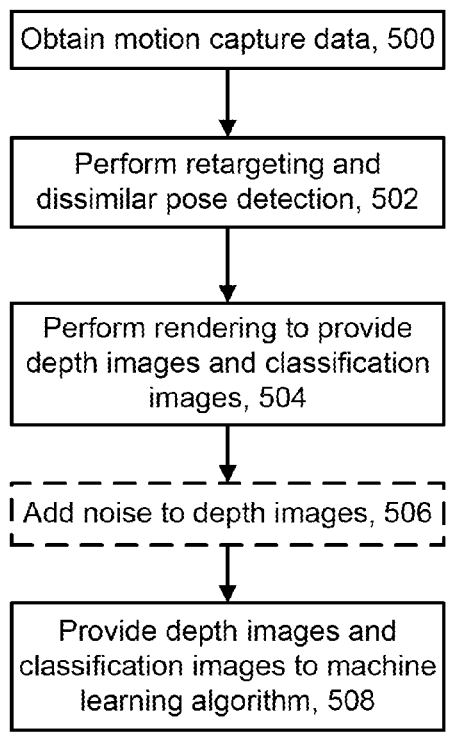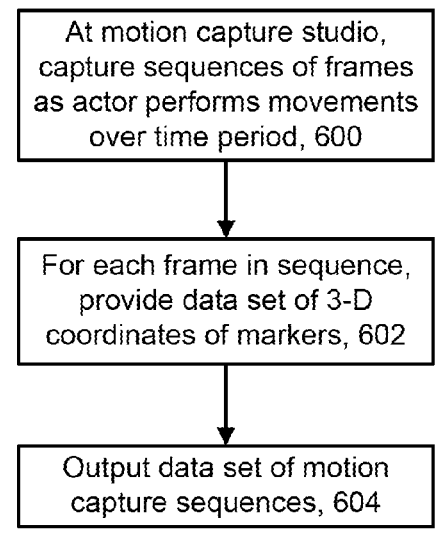

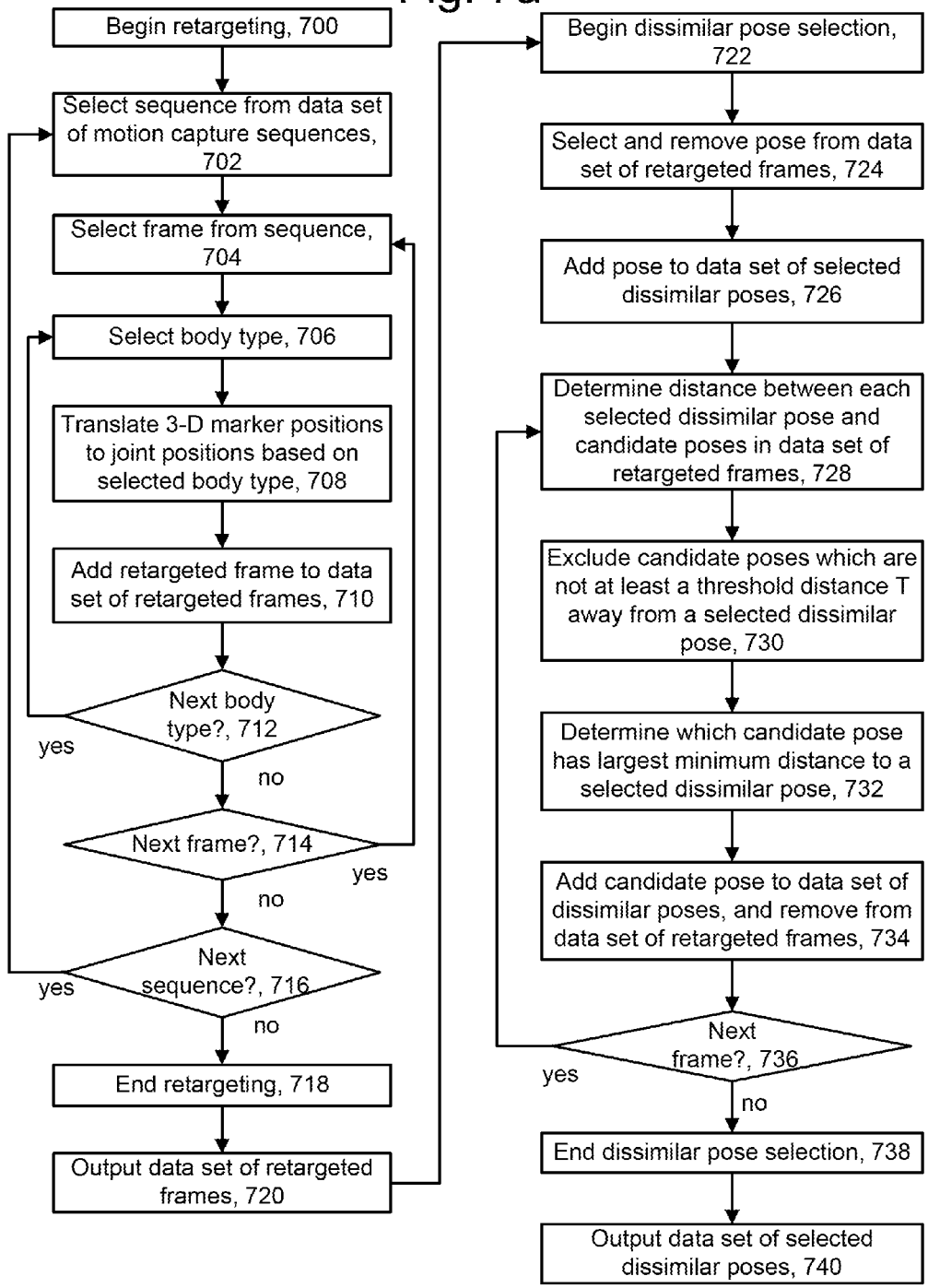

Fig. 7b

Algorithm for dissimilar pose detection
Input: Set of motion capture frames S'.
Input: Integer D≥0: number of frames to retain.
Input: Distance function $\phi$: measures distance between pairs of frames.
Input: Distance threshold T: pairs of retained frames should not be closer than T.
Output: Set of integers $P_I$ indexing into S'.

1: Initialize $P_I$ to contain any single element of S'
2: repeat
3:       // 1. Compute $F_{max}$ = argmax $_{f \in S'}$ min $g_{\in PI}$ $\phi$(F, S'[g])
4:       $F_{max}$ = null
5:       $\phi_{max}$ = 0
6:       for all f in S' do
7:               $G_{min}$ = null
8:               for all g in $P_I$ do
9:                       if $G_{min}$ = null or $\phi$(f, S'[g]) < $\phi$(f,$G_{min}$) then
10:                              $G_{min}$ = S'[g]
11:                      end if
12:              end for
13:              if $\phi$(f,$G_{min}$) > $\phi_{max}$ then
14:                      $F_{max}$ = f
15:                      $\phi_{max}$ = $\phi$(f,$G_{min}$)
16:              end if
17:      end for
18:      // 2. Terminate if distance smaller than T
19:      return if $\phi_{max}$ < T
20:      // 3. Add Fmax to PI
21:      Add $F_{max}$ to $P_I$
22: until size($P_I$) = D

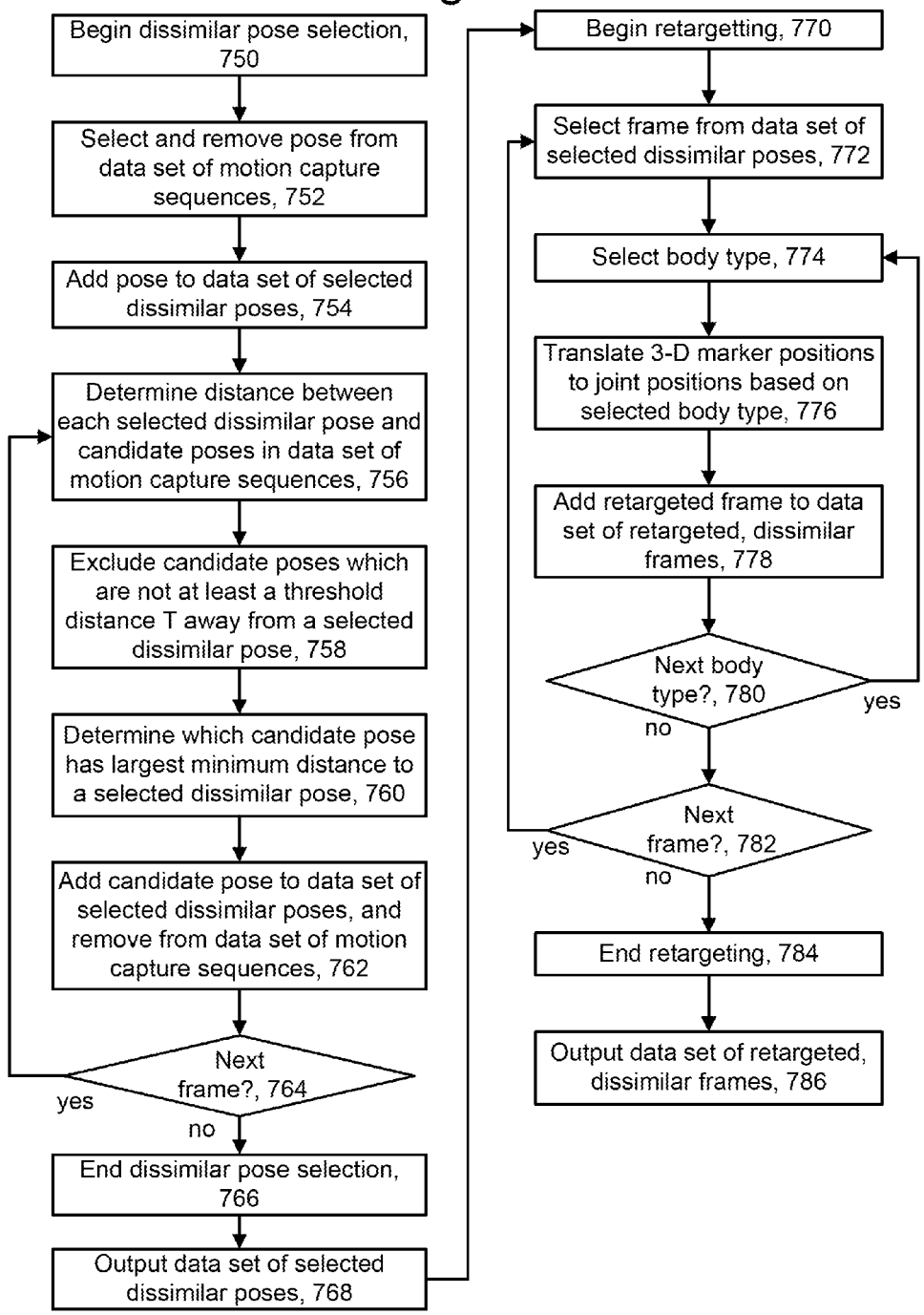

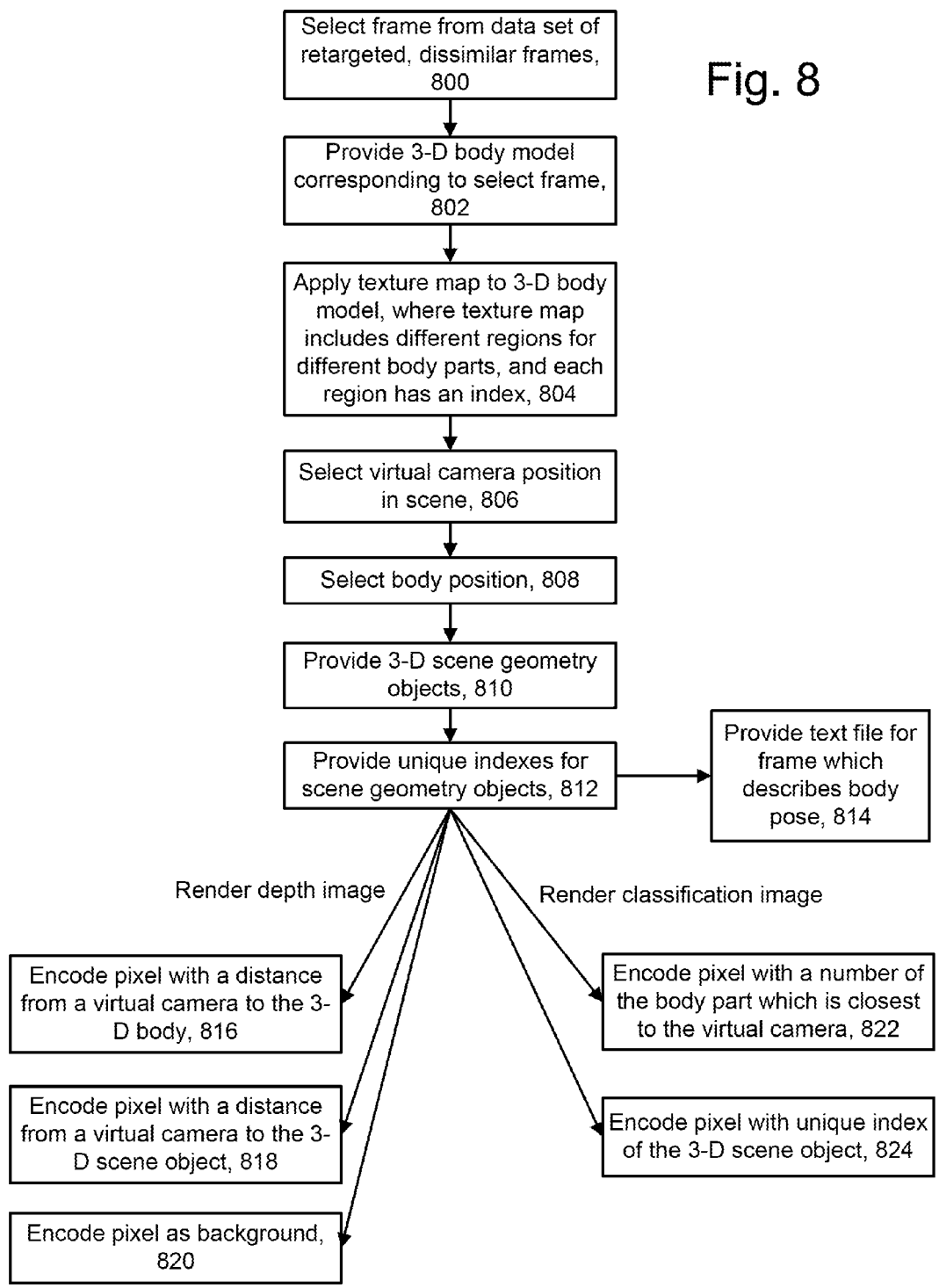

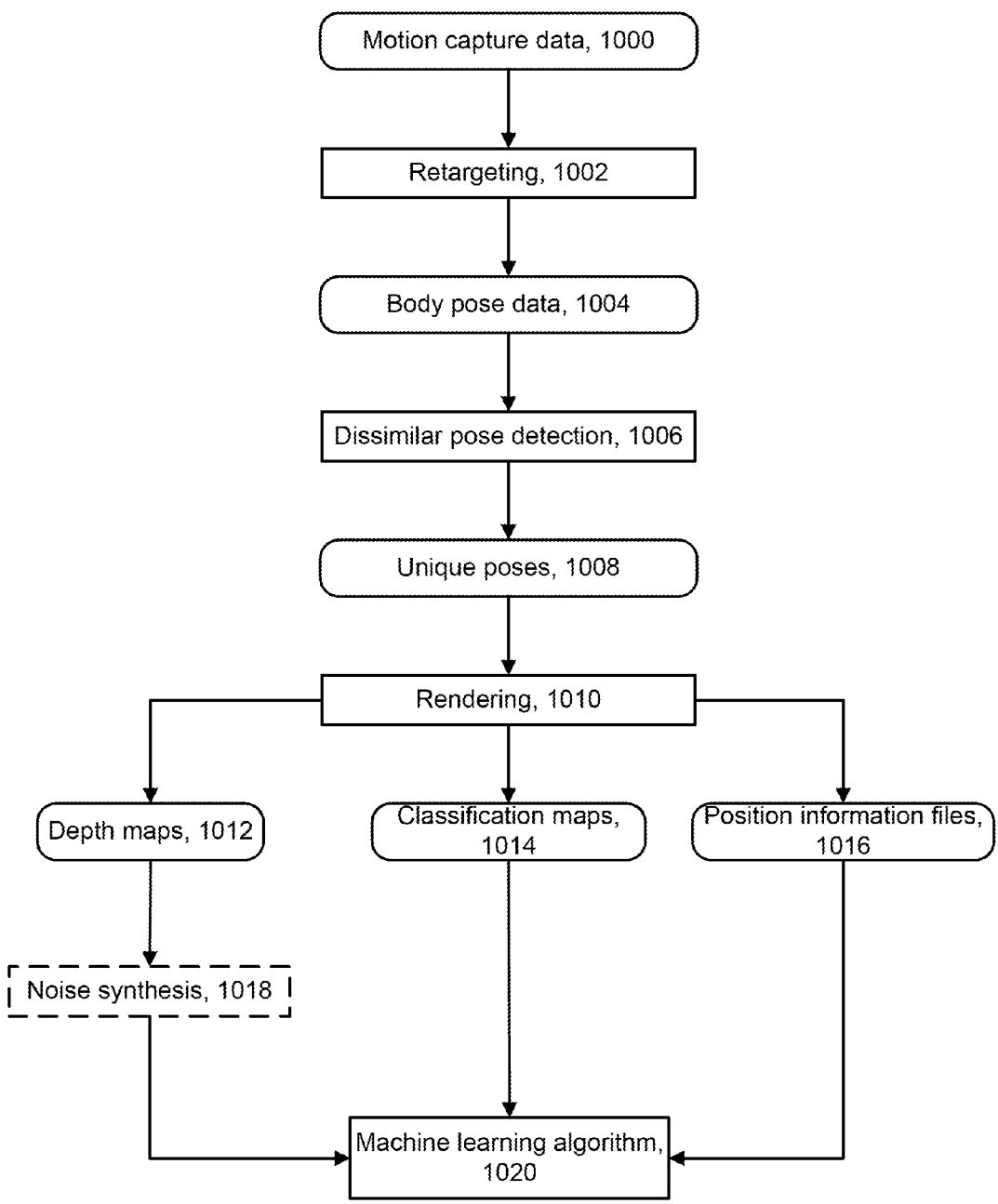

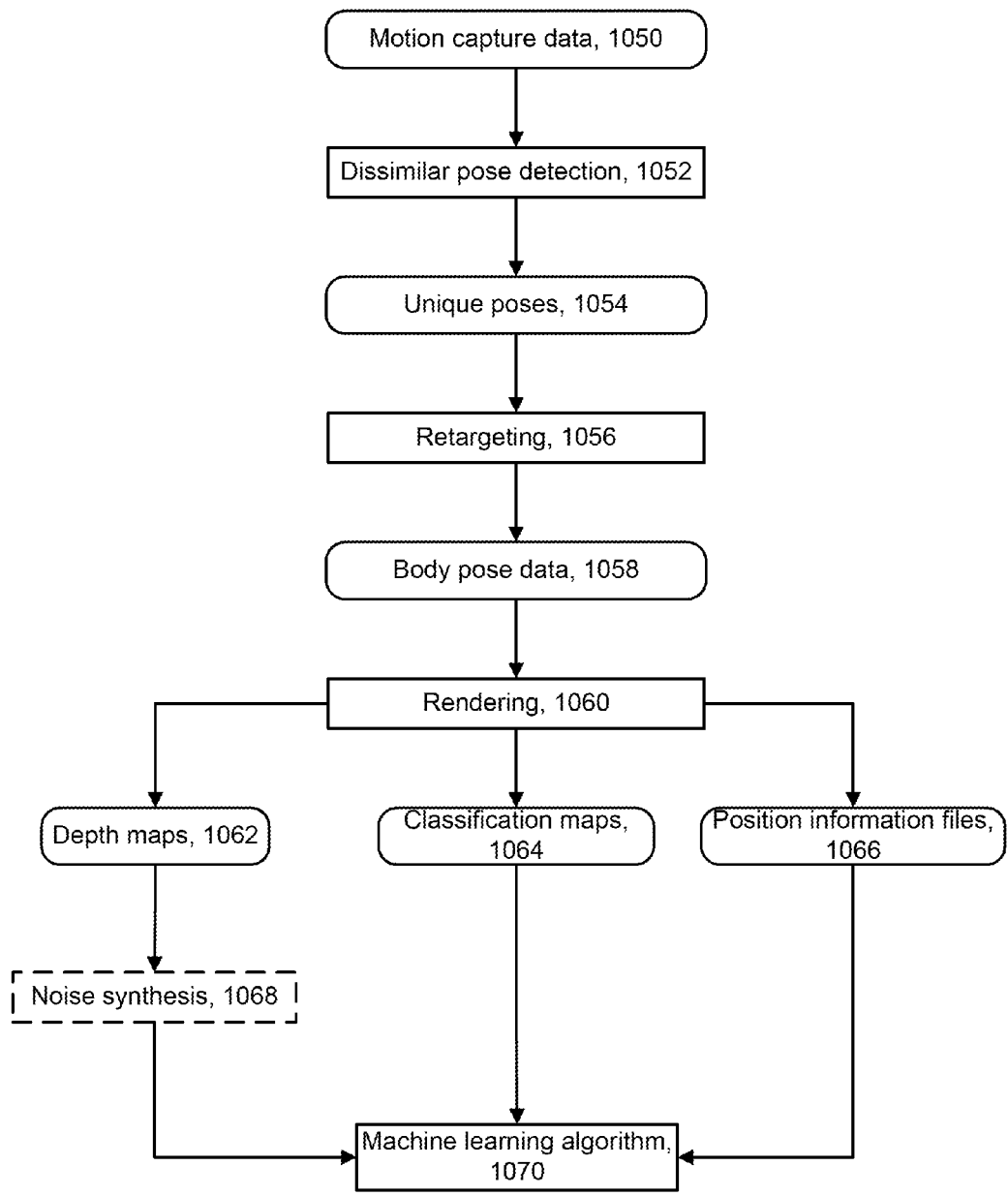

PROXY TRAINING DATA FOR HUMAN BODY TRACKING

BACKGROUND

Tracking systems obtain data regarding the location and movement of a human or other subject in a physical space, and can use the data as an input to an application in a computing system. Some systems determine a skeletal model of a body, including joints of the skeleton, and can therefore be considered to be body joint tracking systems. Many applications are possible, such as for military, entertainment, sports and medical purposes. For instance, the motion of humans can be used to create an animated character or avatar. Optical systems, including those using visible and invisible, e.g., infrared, light, use cameras to detect the presence of a human in a field of view. However, there is a need to facilitate the development of a body joint tracking system by providing training data in the form of synthesized images.

SUMMARY

A processor-implemented method, system and tangible computer readable storage are provided for generating proxy training data for human body tracking in a body joint tracking system.

In the development of a body joint tracking system, a depth camera is used to obtain a depth image of a person moving in a field of view of the camera. Various processing techniques are used to detect the person's body and recognize movements or poses which are performed by the person. This process can be considered to be a supervised machine learning algorithm. The process is supervised because the location and poses of the person are known. The goal is to have the body joint tracking system learn how to recognize the location and poses of the person. Various adjustments can be made to the learning algorithm, e.g., to filter out noise, to recognize different body types, and to distinguish the person's body from other objects which may be present in the field of view, such as furniture, walls and so forth. However, training the learning algorithm using a live person in a real world environment is inefficient and does not accurately represent a range of scenarios which a body joint tracking system will experience when it is deployed as a commercial product in thousands or even millions of user's homes.

To optimize the training of the learning algorithm, synthetic images can be generated as a substitute or proxy for images of a real person. The synthetic images can be used to augment or replace images of a real person. Further, the synthetic images can be provided in a way that is computationally efficient, while being realistic and providing a high degree of variability to simulate real-world conditions which a body joint tracking system will experience when it is deployed.

In one embodiment, a processor-implemented method for generating proxy training data for human body tracking is provided. The method includes a number of processor-implemented steps. The method includes accessing at least one motion capture sequence which identifies poses of an actor's body during a time period in which the actor performs a movement. For example, the sequences can be obtained in a motion capture studio by imaging an actor wearing a motion capture suit with markers, as the actor performs a series of prescribed movements. The method further includes performing retargeting to a number of different body types, and dissimilar pose selection, based on the at least one motion capture sequence, to provide a number of retargeted, dissimilar poses. The method further includes rendering each of the dissimilar poses according to a 3-D body model for a respective body type, to provide a respective depth image of the dissimilar pose, and to provide a respective classification image which identifies body parts of the dissimilar pose. A number of different 3-D body models are used, one for each body type. Further, the respective depth image and the respective classification image comprise pixel data which is usable by a machine learning algorithm for human body tracking.

In one approach, retargeting is performed before dissimilar pose selection, and in another approach, retargeting is performed after dissimilar pose selection. Optionally, noise is add to the depth images to provide a more realistic depth image which is similar to a depth image which will be seen by a depth camera in a real world environment. The noise can include noise which is caused by the presence of hair on a person, depth quantization noise, random noise, noise caused by edges of a person's body, noise caused by detection of very thin structures and noise caused by the camera geometry.

This summary is provided to introduce a selection of concepts in a simplified form that are further described below in the description. This summary is not intended to identify key features or essential features of the claimed subject matter, nor is it intended to be used to limit the scope of the claimed subject matter.

BRIEF DESCRIPTION OF THE DRAWINGS

In the drawings, like-numbered elements correspond to one another.

FIG. 5 depicts a method for providing proxy training data for human body tracking.

FIG. 6 provides further details of obtaining motion capture data (step 500 of FIG. 5).

FIG. 7a provides further details of performing retargeting and dissimilar pose detection (step 502 of FIG. 5), where retargeting is performed first.

FIG. 7b depicts an algorithm for dissimilar pose selection.

FIG. 7c provides further details of performing retargeting and dissimilar pose detection (step 502 of FIG. 5), where dissimilar pose detection is performed first.

FIG. 8 provides further details of performing rendering to provide depth images and classification images (step 504 of FIG. 5).

FIG. 10a depicts an alternative view of the process of FIG. 5, where retargeting is performed before dissimilar pose detection.

FIG. 10b depicts an alternative view of the process of FIG. 5, where retargeting is performed after dissimilar pose detection.

FIG. 12 depicts an example of joint locations in a skeleton derived from the pose of the actor of FIG. 11a.

FIG. 14 depicts a classification image corresponding to the 3-D body of FIG. 13a.

FIG. 15b depicts an example classification image corresponding to the depth image of FIG. 15a.

DETAILED DESCRIPTION

Techniques are provided for generating synthesized image for use by a machine learning algorithm of a body joint tracking system. A limited number of motion capture sequences are obtained from a motion capture studio. The motion capture sequences include poses or movements performed by an actor. These sequences are leveraged to provide an increased degree of variability by retargeting the sequences to a number of different body types. Efficiency is achieved by selecting dissimilar poses so that redundant poses or near redundant poses are not provided to the machine learning algorithm. Moreover, greater realism is achieved by adding a variety of types of noises which are expected to be seen in a real world deployment of the body joint tracking system. Other random variations can be introduced as well. For example, a degree of randomness can be added to the retargeting. The data provided to the learning algorithm includes labeled training data in the form of registered pairs of depth and classification images, along with pose data.

The techniques provided herein avoid providing an overwhelming amount of data to the training algorithm, while still covering a large range of poses and body types, including, e.g., independent movement of the upper and lower body. A single system can be provided which can handle a large range of poses and body types.

Features include sample selection based on distances between poses, generation of new samples by combining partial skeletons, generation of synthetic backgrounds by inserting 3-D models and generation of synthetic noisy images by perturbing the depth map.

Figure 1:
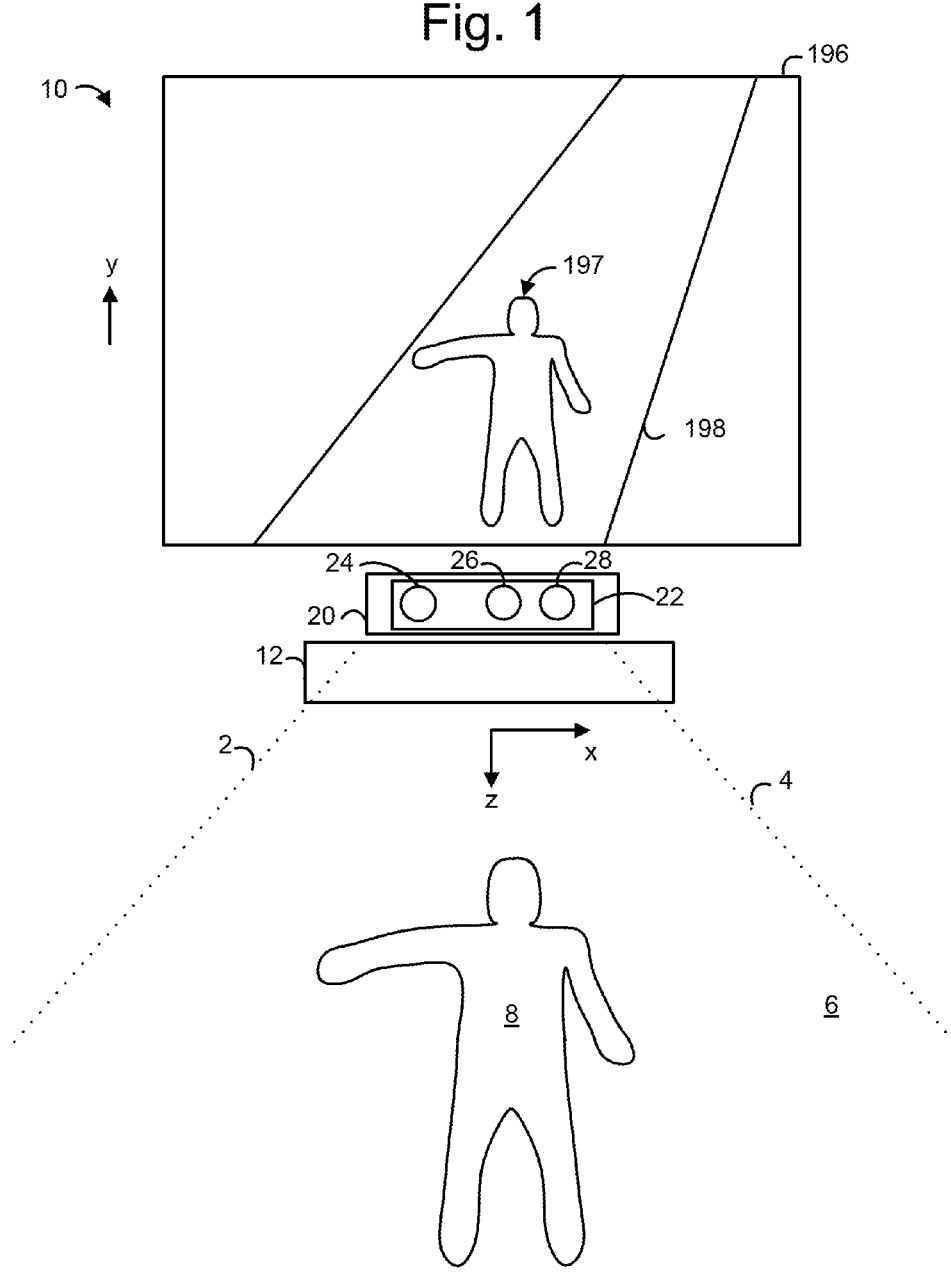
FIG. 1 depicts an example embodiment of a body joint tracking system.

FIG. 1 depicts an example embodiment of a body joint tracking system 10 in which a person 8 interacts with an application. This illustrates the real world deployment of a body joint tracking system, such as in the home of a user. The body joint tracking system 10 includes a display 196, a depth camera system 20, and a computing environment or apparatus 12. The depth camera system 20 may include an image camera component 22 having an infrared (IR) light emitter 24, an infrared camera 26 and a red-green-blue (RGB) camera 28. A user 8, also referred to as a person or player, stands in a field of view 6 of the depth camera. Lines 2 and 4 denote a boundary of the field of view 6. In this example, the depth camera system 20, and computing environment 12 provide an application in which an avatar 197 on the display 196 track the movements of the user 8. For example, the avatar may raise an arm when the user raises an arm. The avatar 197 is standing on a road 198 in a 3-D virtual world. A Cartesian world coordinate system may be defined which includes a z-axis which extends along the focal length of the depth camera system 20, e.g., horizontally, a y-axis which extends vertically, and an x-axis which extends laterally and horizontally. Note that the perspective of the drawing is modified as a simplification, as the display 196 extends vertically in the y-axis direction and the z-axis extends out from the depth camera system, perpendicular to the y-axis and the x-axis, and parallel to a ground surface on which the user 8 stands.

Generally, the body joint tracking system 10 is used to recognize, analyze, and/or track a human target. The computing environment 12 can include a computer, a gaming system or console, or the like, as well as hardware components and/or software components to execute applications.

The depth camera system 20 may include a camera which is used to visually monitor one or more people, such as the user 8, such that gestures and/or movements performed by the user may be captured, analyzed, and tracked to perform one or more controls or actions within an application, such as animating an avatar or on-screen character or selecting a menu item in a user interface (UI).

The body joint tracking system 10 may be connected to an audiovisual device such as the display 196, e.g., a television, a monitor, a high-definition television (HDTV), or the like, or even a projection on a wall or other surface, that provides a visual and audio output to the user. An audio output can also be provided via a separate device. To drive the display, the computing environment 12 may include a video adapter such as a graphics card and/or an audio adapter such as a sound card that provides audiovisual signals associated with an application. The display 196 may be connected to the computing environment 12 via, for example, an S-Video cable, a coaxial cable, an HDMI cable, a DVI cable, a VGA cable, or the like.

The user 8 may be tracked using the depth camera system 20 such that the gestures and/or movements of the user are captured and used to animate an avatar or on-screen character and/or interpreted as input controls to the application being executed by computer environment 12.

Some movements of the user 8 may be interpreted as controls that may correspond to actions other than controlling an avatar. For example, in one embodiment, the player may use movements to end, pause, or save a game, select a level, view high scores, communicate with a friend, and so forth. The player may use movements to select the game or other application from a main user interface, or to otherwise navigate a menu of options. Thus, a full range of motion of the user 8 may be available, used, and analyzed in any suitable manner to interact with an application.

The person can hold an object such as a prop when interacting with an application. In such embodiments, the movement of the person and the object may be used to control an application. For example, the motion of a player holding a racket may be tracked and used for controlling an on-screen racket in an application which simulates a tennis game. In another example embodiment, the motion of a player holding a toy weapon such as a plastic sword may be tracked and used for controlling a corresponding weapon in the virtual world of an application which provides a pirate ship.

The body joint tracking system 10 may further be used to interpret target movements as operating system and/or application controls that are outside the realm of games and other applications which are meant for entertainment and leisure. For example, virtually any controllable aspect of an operating system and/or application may be controlled by movements of the user 8.

Figure 2:
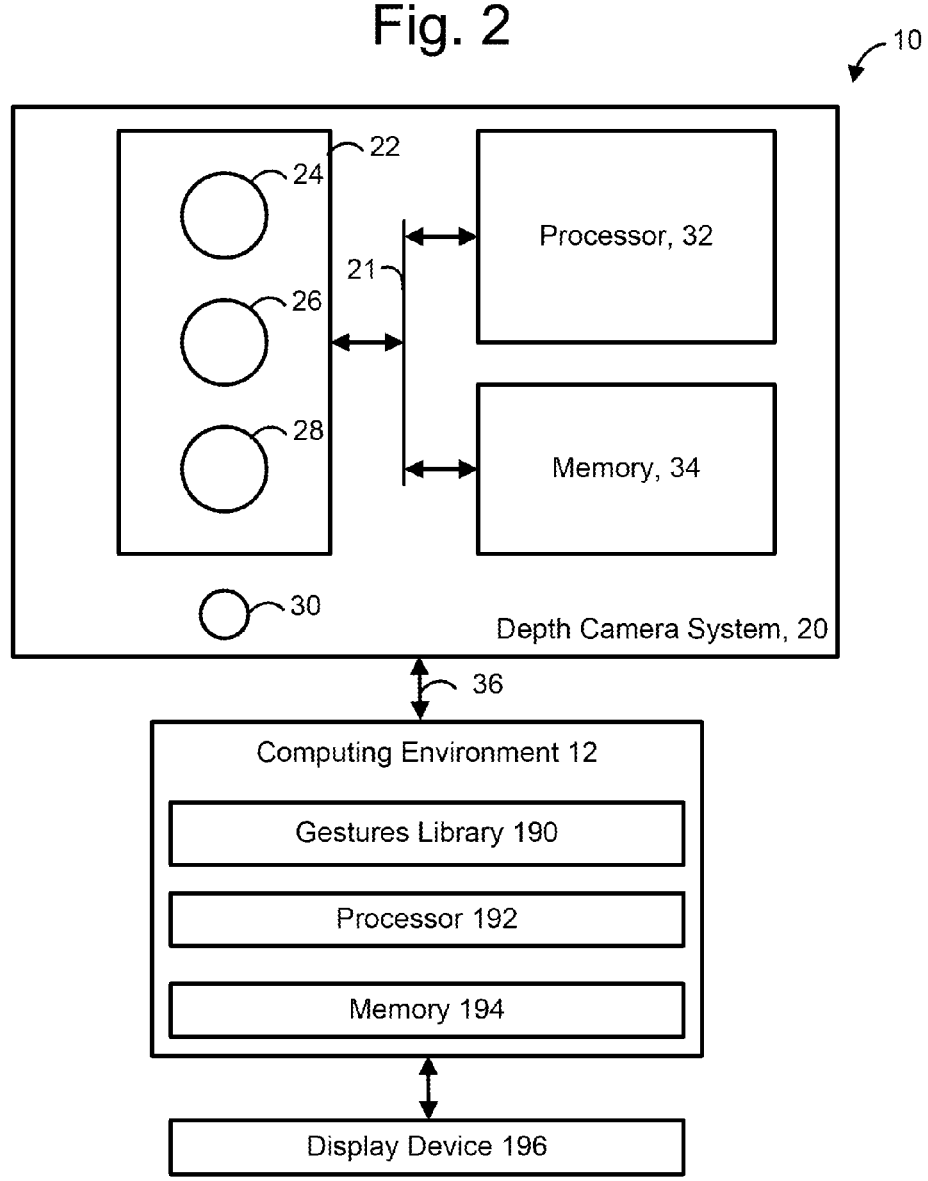
FIG. 2 depicts an example block diagram of the body joint tracking system of FIG. 1.

FIG. 2 depicts an example block diagram of the body joint tracking system 10 of FIG. 1a. The depth camera system 20 may be configured to capture video with depth information including a depth image that may include depth values, via any suitable technique including, for example, time-of-flight, structured light, stereo image, or the like. The depth camera system 20 may organize the depth information into "Z layers," or layers that may be perpendicular to a Z axis extending from the depth camera along its line of sight.

The depth camera system 20 may include an image camera component 22, such as a depth camera that captures the depth image of a scene in a physical space. The depth image may include a two-dimensional (2-D) pixel area of the captured scene, where each pixel in the 2-D pixel area has an associated depth value which represents a linear distance from the image camera component 22.

The image camera component 22 may include an infrared (IR) light emitter 24, an infrared camera 26, and a red-green-blue (RGB) camera 28 that may be used to capture the depth image of a scene. A 3-D camera is formed by the combination of the infrared emitter 24 and the infrared camera 26. For example, in time-of-flight analysis, the IR light emitter 24 emits infrared light onto the physical space and the infrared camera 26 detects the backscattered light from the surface of one or more targets and objects in the physical space. In some embodiments, pulsed infrared light may be used such that the time between an outgoing light pulse and a corresponding incoming light pulse is measured and used to determine a physical distance from the depth camera system 20 to a particular location on the targets or objects in the physical space. The phase of the outgoing light wave may be compared to the phase of the incoming light wave to determine a phase shift. The phase shift may then be used to determine a physical distance from the depth camera system to a particular location on the targets or objects.

A time-of-flight analysis may also be used to indirectly determine a physical distance from the depth camera system 20 to a particular location on the targets or objects by analyzing the intensity of the reflected beam of light over time via various techniques including, for example, shuttered light pulse imaging.

In another example embodiment, the depth camera system 20 may use a structured light to capture depth information. In such an analysis, patterned light (i.e., light displayed as a known pattern such as grid pattern or a stripe pattern) may be projected onto the scene via, for example, the IR light emitter 24. Upon striking the surface of one or more targets or objects in the scene, the pattern may become deformed in response. Such a deformation of the pattern may be captured by, for example, the infrared camera 26 and/or the RGB camera 28 and may then be analyzed to determine a physical distance from the depth camera system to a particular location on the targets or objects.

The depth camera system 20 may include two or more physically separated cameras that may view a scene from different angles to obtain visual stereo data that may be resolved to generate depth information.

The depth camera system 20 may further include a microphone 30 which includes, e.g., a transducer or sensor that receives and converts sound waves into an electrical signal. Additionally, the microphone 30 may be used to receive audio signals such as sounds that are provided by a person to control an application that is run by the computing environment 12. The audio signals can include vocal sounds of the person such as spoken words, whistling, shouts and other utterances as well as non-vocal sounds such as clapping hands or stomping feet.

The depth camera system 20 may include a processor 32 that is in communication with the image camera component 22. The processor 32 may include a standardized processor, a specialized processor, a microprocessor, or the like that may execute instructions including, for example, instructions for receiving a depth image; generating a grid of voxels based on the depth image; removing a background included in the grid of voxels to isolate one or more voxels associated with a human target; determining a location or position of one or more extremities of the isolated human target; adjusting a model based on the location or position of the one or more extremities, or any other suitable instruction, which will be described in more detail below.

The depth camera system 20 may further include a memory component 34 that may store instructions that are executed by the processor 32, as well as storing images or frames of images captured by the 3-D camera or RGB camera, or any other suitable information, images, or the like. According to an example embodiment, the memory component 34 may include random access memory (RAM), read only memory (ROM), cache, flash memory, a hard disk, or any other suitable tangible computer readable storage component. The memory component 34 may be a separate component in communication with the image capture component 22 and the processor 32 via a bus 21. According to another embodiment, the memory component 34 may be integrated into the processor 32 and/or the image capture component 22.

The depth camera system 20 may be in communication with the computing environment 12 via a communication link 36. The communication link 36 may be a wired and/or a wireless connection. According to one embodiment, the computing environment 12 may provide a clock signal to the depth camera system 20 via the communication link 36 that indicates when to capture image data from the physical space which is in the field of view of the depth camera system 20.

Additionally, the depth camera system 20 may provide the depth information and images captured by, for example, the 3-D camera 26 and/or the RGB camera 28, and/or a skeletal model that may be generated by the depth camera system 20 to the computing environment 12 via the communication link 36. The computing environment 12 may then use the model, depth information, and captured images to control an application. For example, as shown in FIG. 2, the computing environment 12 may include a gestures library 190, such as a collection of gesture filters, each having information concerning a gesture that may be performed by the skeletal model (as the user moves). For example, a gesture filter can be provided for various hand gestures, such as swiping or flinging of the hands. By comparing a detected motion to each filter, a specified gesture or movement which is performed by a person can be identified. An extent to which the movement is performed can also be determined.

The data captured by the depth camera system 20 in the form of the skeletal model and movements associated with it may be compared to the gesture filters in the gesture library 190 to identify when a user (as represented by the skeletal model) has performed one or more specific movements. Those movements may be associated with various controls of an application.

The computing environment may also include a processor 192 for executing instructions which are stored in a memory 194 to provide audio-video output signals to the display device 196 and to achieve other functionality as described herein.

Figure 3:
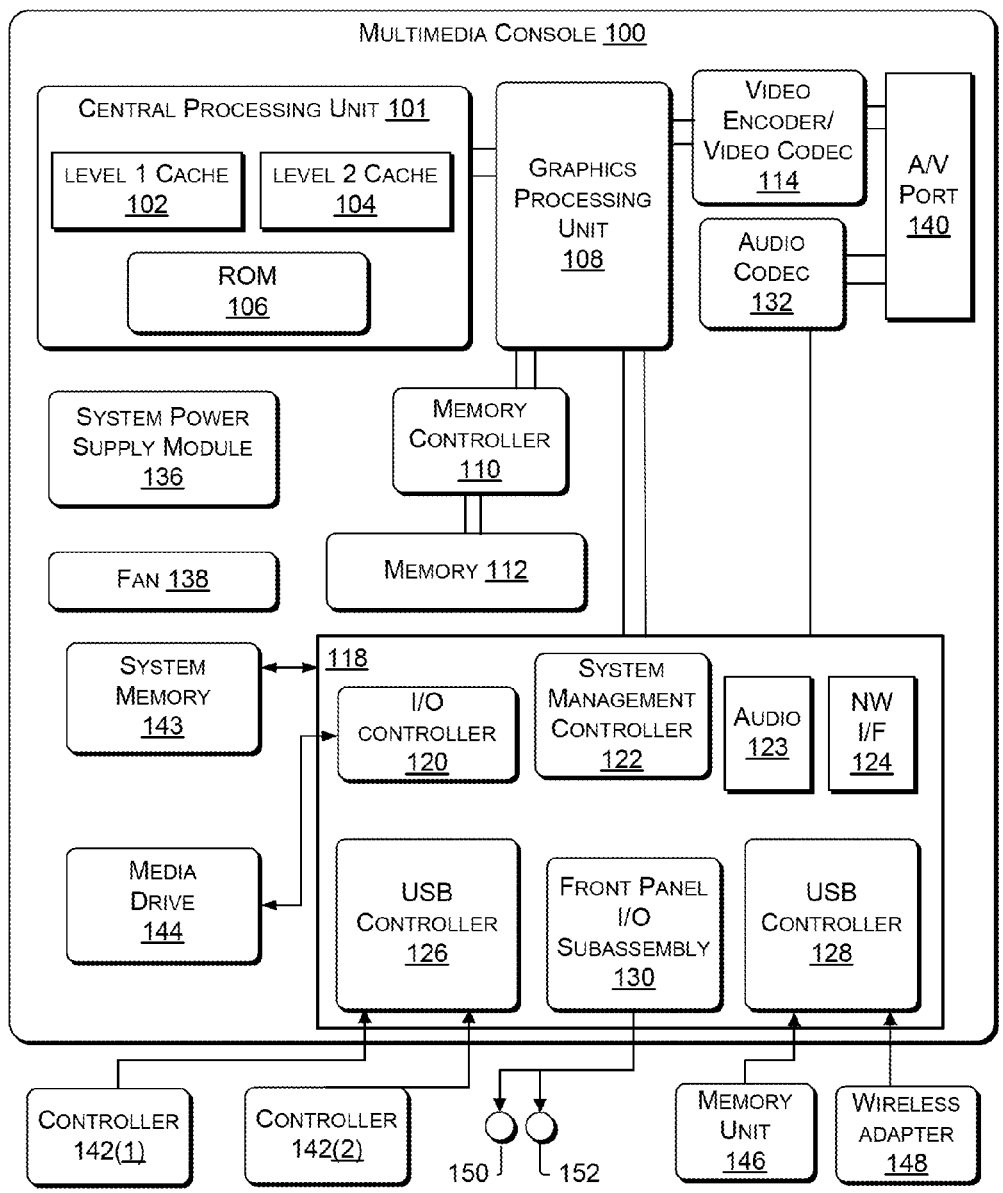
FIG. 3 depicts an example block diagram of a computing environment that may be used in the body joint tracking system of FIG. 1.

FIG. 3 depicts an example block diagram of a computing environment that may be used in the body joint tracking system of FIG. 1. The computing environment can be used to interpret one or more gestures or other movements and, in response, update a visual space on a display. The computing environment such as the computing environment 12 described above may include a multimedia console 100, such as a gaming console. The multimedia console 100 has a central processing unit (CPU) 101 having a level 1 cache 102, a level 2 cache 104, and a flash ROM (Read Only Memory) 106. The level 1 cache 102 and a level 2 cache 104 temporarily store data and hence reduce the number of memory access cycles, thereby improving processing speed and throughput. The CPU 101 may be provided having more than one core, and thus, additional level 1 and level 2 caches 102 and 104. The memory 106 such as flash ROM may store executable code that is loaded during an initial phase of a boot process when the multimedia console 100 is powered on.

A graphics processing unit (GPU) 108 and a video encoder/video codec (coder/decoder) 114 form a video processing pipeline for high speed and high resolution graphics processing. Data is carried from the graphics processing unit 108 to the video encoder/video codec 114 via a bus. The video processing pipeline outputs data to an A/V (audio/video) port 140 for transmission to a television or other display. A memory controller 110 is connected to the GPU 108 to facilitate processor access to various types of memory 112, such as RAM (Random Access Memory).

The multimedia console 100 includes an I/O controller 120, a system management controller 122, an audio processing unit 123, a network interface 124, a first USB host controller 126, a second USB controller 128 and a front panel I/O subassembly 130 that are preferably implemented on a module 118. The USB controllers 126 and 128 serve as hosts for peripheral controllers 142(1)-142(2), a wireless adapter 148, and an external memory device 146 (e.g., flash memory, external CD/DVD ROM drive, removable media, etc.). The network interface (NW IF) 124 and/or wireless adapter 148 provide access to a network (e.g., the Internet, home network, etc.) and may be any of a wide variety of various wired or wireless adapter components including an Ethernet card, a modem, a Bluetooth module, a cable modem, and the like.

System memory 143 is provided to store application data that is loaded during the boot process. A media drive 144 is provided and may comprise a DVD/CD drive, hard drive, or other removable media drive. The media drive 144 may be internal or external to the multimedia console 100. Application data may be accessed via the media drive 144 for execution, playback, etc. by the multimedia console 100. The media drive 144 is connected to the I/O controller 120 via a bus, such as a Serial ATA bus or other high speed connection.

The system management controller 122 provides a variety of service functions related to assuring availability of the multimedia console 100. The audio processing unit 123 and an audio codec 132 form a corresponding audio processing pipeline with high fidelity and stereo processing. Audio data is carried between the audio processing unit 123 and the audio codec 132 via a communication link. The audio processing pipeline outputs data to the A/V port 140 for reproduction by an external audio player or device having audio capabilities.

The front panel I/O subassembly 130 supports the functionality of the power button 150 and the eject button 152, as well as any LEDs (light emitting diodes) or other indicators exposed on the outer surface of the multimedia console 100. A system power supply module 136 provides power to the components of the multimedia console 100. A fan 138 cools the circuitry within the multimedia console 100.

The CPU 101, GPU 108, memory controller 110, and various other components within the multimedia console 100 are interconnected via one or more buses, including serial and parallel buses, a memory bus, a peripheral bus, and a processor or local bus using any of a variety of bus architectures.

When the multimedia console 100 is powered on, application data may be loaded from the system memory 143 into memory 112 and/or caches 102, 104 and executed on the CPU 101. The application may present a graphical user interface that provides a consistent user experience when navigating to different media types available on the multimedia console 100. In operation, applications and/or other media contained within the media drive 144 may be launched or played from the media drive 144 to provide additional functionalities to the multimedia console 100.

The multimedia console 100 may be operated as a standalone system by simply connecting the system to a television or other display. In this standalone mode, the multimedia console 100 allows one or more users to interact with the system, watch movies, or listen to music. However, with the integration of broadband connectivity made available through the network interface 124 or the wireless adapter 148, the multimedia console 100 may further be operated as a participant in a larger network community.

When the multimedia console 100 is powered on, a specified amount of hardware resources are reserved for system use by the multimedia console operating system. These resources may include a reservation of memory (e.g., 16 MB), CPU and GPU cycles (e.g., 5%), networking bandwidth (e.g., 8 kbs), etc. Because these resources are reserved at system boot time, the reserved resources do not exist from the application's view.

In particular, the memory reservation preferably is large enough to contain the launch kernel, concurrent system applications and drivers. The CPU reservation is preferably constant such that if the reserved CPU usage is not used by the system applications, an idle thread will consume any unused cycles.

With regard to the GPU reservation, lightweight messages generated by the system applications (e.g., popups) are displayed by using a GPU interrupt to schedule code to render popup into an overlay. The amount of memory required for an overlay depends on the overlay area size and the overlay preferably scales with screen resolution. Where a full user interface is used by the concurrent system application, it is preferable to use a resolution independent of application resolution. A scaler may be used to set this resolution such that the need to change frequency and cause a TV resynch is eliminated.

After the multimedia console 100 boots and system resources are reserved, concurrent system applications execute to provide system functionalities. The system functionalities are encapsulated in a set of system applications that execute within the reserved system resources described above. The operating system kernel identifies threads that are system application threads versus gaming application threads. The system applications are preferably scheduled to run on the CPU 101 at predetermined times and intervals in order to provide a consistent system resource view to the application. The scheduling is to minimize cache disruption for the gaming application running on the console.

When a concurrent system application requires audio, audio processing is scheduled asynchronously to the gaming application due to time sensitivity. A multimedia console application manager (described below) controls the gaming application audio level (e.g., mute, attenuate) when system applications are active.

Input devices (e.g., controllers 142(1) and 142(2)) are shared by gaming applications and system applications. The input devices are not reserved resources, but are to be switched between system applications and the gaming application such that each will have a focus of the device. The application manager preferably controls the switching of input stream, without knowledge the gaming application's knowledge and a driver maintains state information regarding focus switches. The console 100 may receive additional inputs from the depth camera system 20 of FIG. 2, including the cameras 26 and 28.

Figure 4:
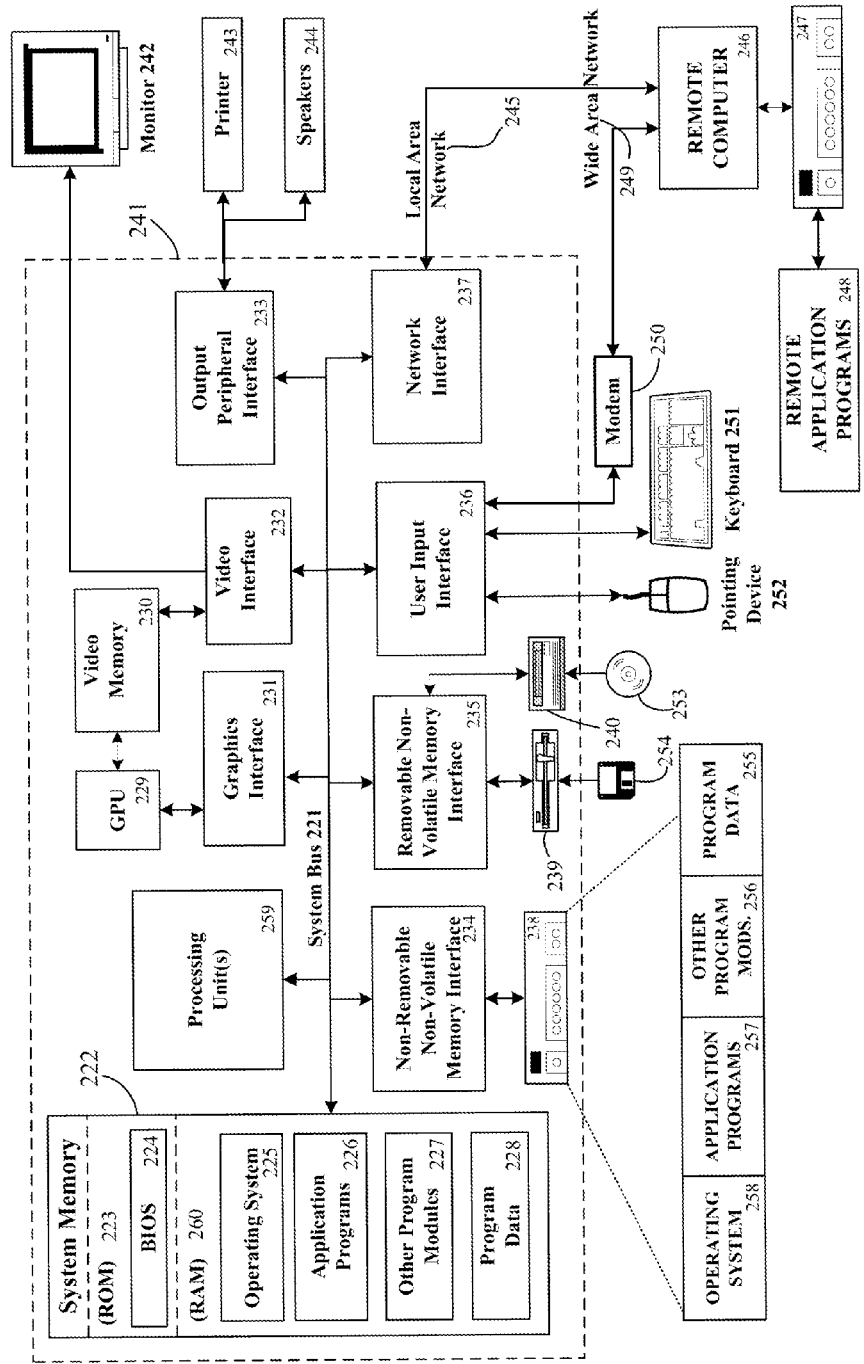
FIG. 4 depicts another example block diagram of a computing environment that may be used in the body joint tracking system of FIG. 1, or in a computer graphics system for retargeting, dissimilar pose selection and rendering.

FIG. 4 depicts another example block diagram of a computing environment that may be used in the body joint tracking system of FIG. 1, or in a computer graphics system for retargeting, dissimilar pose selection and rendering.

In a body joint tracking system, the computing environment can be used to interpret one or more gestures or other movements and, in response, update a visual space on a display. The computing environment 220 comprises a computer 241, which typically includes a variety of tangible computer readable storage media. This can be any available media that can be accessed by computer 241 and includes both volatile and nonvolatile media, removable and non-removable media. The system memory 222 includes computer storage media in the form of volatile and/or nonvolatile memory such as read only memory (ROM) 223 and random access memory (RAM) 260. A basic input/output system 224 (BIOS), containing the basic routines that help to transfer information between elements within computer 241, such as during start-up, is typically stored in ROM 223. RAM 260 typically contains data and/or program modules that are immediately accessible to and/or presently being operated on by processing unit 259. A graphics interface 231 communicates with a GPU 229. By way of example, and not limitation, FIG. 4 depicts operating system 225, application programs 226, other program modules 227, and program data 228.

The computer 241 may also include other removable/non-removable, volatile/nonvolatile computer storage media, e.g., a hard disk drive 238 that reads from or writes to non-removable, nonvolatile magnetic media, a magnetic disk drive 239 that reads from or writes to a removable, nonvolatile magnetic disk 254, and an optical disk drive 240 that reads from or writes to a removable, nonvolatile optical disk 253 such as a CD ROM or other optical media. Other removable/non-removable, volatile/nonvolatile tangible computer readable storage media that can be used in the exemplary operating environment include, but are not limited to, magnetic tape cassettes, flash memory cards, digital versatile disks, digital video tape, solid state RAM, solid state ROM, and the like. The hard disk drive 238 is typically connected to the system bus 221 through an non-removable memory interface such as interface 234, and magnetic disk drive 239 and optical disk drive 240 are typically connected to the system bus 221 by a removable memory interface, such as interface 235.

The drives and their associated computer storage media discussed above and depicted in FIG. 4, provide storage of computer readable instructions, data structures, program modules and other data for the computer 241. For example, hard disk drive 238 is depicted as storing operating system 258, application programs 257, other program modules 256, and program data 255. Note that these components can either be the same as or different from operating system 225, application programs 226, other program modules 227, and program data 228. Operating system 258, application programs 257, other program modules 256, and program data 255 are given different numbers here to depict that, at a minimum, they are different copies. A user may enter commands and information into the computer 241 through input devices such as a keyboard 251 and pointing device 252, commonly referred to as a mouse, trackball or touch pad. Other input devices (not shown) may include a microphone, joystick, game pad, satellite dish, scanner, or the like. These and other input devices are often connected to the processing unit 259 through a user input interface 236 that is coupled to the system bus, but may be connected by other interface and bus structures, such as a parallel port, game port or a universal serial bus (USB). The depth camera system 20 of FIG. 2, including cameras 26 and 28, may define additional input devices for the console 100. A monitor 242 or other type of display is also connected to the system bus 221 via an interface, such as a video interface 232. In addition to the monitor, computers may also include other peripheral output devices such as speakers 244 and printer 243, which may be connected through a output peripheral interface 233.

The computer 241 may operate in a networked environment using logical connections to one or more remote computers, such as a remote computer 246. The remote computer 246 may be a personal computer, a server, a router, a network PC, a peer device or other common network node, and typically includes many or all of the elements described above relative to the computer 241, although only a memory storage device 247 has been depicted in FIG. 4. The logical connections include a local area network (LAN) 245 and a wide area network (WAN) 249, but may also include other networks. Such networking environments are commonplace in offices, enterprise-wide computer networks, intranets and the Internet.

When used in a LAN networking environment, the computer 241 is connected to the LAN 245 through a network interface or adapter 237. When used in a WAN networking environment, the computer 241 typically includes a modem 250 or other means for establishing communications over the WAN 249, such as the Internet. The modem 250, which may be internal or external, may be connected to the system bus 221 via the user input interface 236, or other appropriate mechanism. In a networked environment, program modules depicted relative to the computer 241, or portions thereof, may be stored in the remote memory storage device. By way of example, and not limitation, FIG. 4 depicts remote application programs 248 as residing on memory device 247. It will be appreciated that the network connections shown are exemplary and other means of establishing a communications link between the computers may be used.

The computing environment can include tangible computer readable storage having computer readable software embodied thereon for programming at least one processor to perform a method for generating proxy training data for human body tracking as described herein. The tangible computer readable storage can include, e.g., one or more of components 222, 234, 235, 230, 253 and 254. Further, one or more processors of the computing environment can provide a processor-implemented method for generating proxy training data for human body tracking, comprising processor-implemented steps as described herein. A processor can include, e.g., one or more of components 229 and 259.

FIG. 5 depicts a method for providing proxy training data for human body tracking Step 500 includes obtaining motion capture data. For example, this can be obtained from an actor in a motion capture studio. In a motion capture studio, movement of one or more actors is sampled many times per second, e.g., 30 times per second. Each sample corresponds to a frame of data. Typically, the actor wears a special suit which has markers which reflect light back to a camera. With the use of multiple high resolution cameras imaging the actors from different positions in the studio, the exact position of each marker can be detected through triangulation. See FIGS. 11a and 11b for further details. The output of step 500 is a set of motion capture sequences. Each such sequence describes the motion of a set of 3-D points on the body of an actor performing a movement. The specific points represented correspond to the positioning of markers on the actor's body and may be different between sequences. A motion capture sequence comprises a set of motion capture frames, where each frame corresponds to the configuration of points at a particular time instant. Step 500 is discussed further below in connection with FIG. 6.

Step 502 includes performing retargeting and dissimilar pose detection. In one approach, retargeting is performed before dissimilar pose selection, and in another approach, retargeting is performed after dissimilar pose selection. Retargeting translates the marker positions which were obtained from the actor in the motion capture studio to skeletal models of different body types. A skeletal model of a given body type can be obtained by determining the locations of joints in the skeletal model based on the locations of the markers. For example, when one or more markers are positioned on the actor in a known location relative to the shoulder, the location of a joint which represents the shoulder can be determined from the marker positions.

A skeletal model or skeleton is a virtual configuration of 3-D joints or other points of the body connected by limbs or bones, such that the configuration of the skeleton may be represented by listing the positions of the 3-D points, or alternatively by enumerating the joint angles which relate individual bones to another bone in the skeleton. This relative positioning may relate each bone to its parent in a tree-structured decomposition of the skeleton. Additionally, shape parameters can be specified with the joint angles, for example specifying the bone lengths.

In the real world use of a body joint tracking system, the imaged users will have many different body types, including variations based on height, width, weight, posture, age, gender, hair type and amount of hair, clothing and so forth. Thus, using only the body type of the actor, or some other standard body type, to provide training data for a learning algorithm of a motion capture would not provide sufficient variability. Retargeting to different body types provides increased variability without the need to obtain motion capture data from many different actors of different body types in a motion capture studio, thus saving costs and time.

Retargeting of motion capture data can involve representing the 3-D data from a motion capture sequence as the parameters of a predefined skeleton of a body type, particularly in the sense of translating the 3-D marker positions for each frame of the motion capture sequence, into a sequence of joint angles (one set of joint angles per frame) and shape parameters (one set of shape parameters per sequence). Sequences captured from the same actor will generally share shape parameters. The 3-D marker positions for each frame of the motion capture sequence can be provided as a sequence of coordinates, such as (x,y,z) coordinates. Similarly, the joint positions of the skeleton can be provided as another sequence of (x,y,z) coordinates. Retargeting to different skeletons and body types can be performed. As an example, 10-15 different body types can be used. The retargeting can also introduce further variations in the body types, such as slightly varied bone or limb lengths, to increase the degree of variability. Generally, a goal is to provide the highest amount of variability among the body poses, within boundaries that are based on a range of real-life human variability.

Dissimilar pose selection analyzes the set of all poses which are obtained from each retargeted motion capture sequence. With a frame rate of 30 frames per second, a motion capture sequence length of, e.g., 1-2 minutes, and retargeting to 15 different body types for each frame, it can be seen that the amount of frames/poses can become voluminous. To improve efficiency, and avoid providing an excessive amount of data with high redundancy to the learning algorithm, a dissimilar pose selection process can be run using each of the frames, to obtain a specified, reduced number of dissimilar poses. The dissimilar pose selection process identifies frames which are a specified distance apart, according to a distance metric. Step 502 is discussed further below in connection with FIGS. 7a-7c. The dissimilar pose selection provides a subset of the motion capture samples which have maximally different skeletons. Each of these samples is used to render a 3-D body model to create a depth map and a classification map or Harlequin map. A number of optional stages may be inserted into the process.

Step 504 includes performing rendering to provide depth images and classification images. Rendering refers to generating a synthetic image in pixel space. A depth image can be rendered from the perspective of a virtual camera which is in a specified position relative to a body which is represented by the depth image. Other factors such as a field of view of the virtual camera can also be specified in rendering the depth image. Essentially, the depth image simulates what a real depth camera will see in a real environment, by simulating a 3-D body and, optionally, scene elements such as a floor, walls, ceiling, furniture and other household objects, in a field of view. The depth image can have a similar pixel resolution as the real depth camera. Further, in the depth image, each pixel can identify a distance from the virtual camera to the 3-D body, a distance from the virtual camera to a 3-D scene object, or a background space, which is a pixel that represents neither a 3-D body or a 3-D scene object.

A classification image or map identifies and labels the different body parts of the 3-D body, or the different 3-D scene elements. For example, each pixel can identify a number of the body part which is closest to the virtual camera, or a unique index of a 3-D scene object. In the learning algorithm for the body joint tracking system, the depth image is processed using settings such as filter settings and a corresponding classification map is generated in which the learning algorithm attempts to identify the body parts and scene elements. The classification map generated by the learning algorithm can be compared to the classification map provided with the depth image to determine how accurate the learning algorithm is. The classification map provided with the depth image essentially is a reference map which provides the correct answer, and the learning algorithm can repeatedly adjust its settings, e.g., train itself, when processing a depth image until it can duplicate the correct result as accurately as possible. Further, the processing of depth images and comparison to the associated classification map can be repeated for the numerous dissimilar frames which the learning algorithm receives as an input data set.

Once the learning algorithm has been optimized, the corresponding settings are recorded and the learning algorithm can be shipped with the body joint tracking system for use by the end user.

The rendering can also provide a text file with each depth image and classification map which describes the pose, such as in terms of joint coordinates of the skeletal model which was used to provide the 3-D body pose. Other data such as settings which were used in the motion capture studio can also be provided. Step 504 is discussed further below in connection with FIG. 8.

Step 506 includes adding noise to some or all of the depth images. The amount and type of noise, and the selection of depth frames to add noise, can be randomized, in one approach. Step 506 is discussed further below in connection with FIG. 9. Step 508 includes providing depth images and classification images to a machine learning algorithm.

FIG. 6 provides further details of obtaining motion capture data (step 500 of FIG. 5).

Step 600 includes, at a motion capture studio, capturing a sequence of frames as an actor performs movements over time. In one approach, a large variety of movements are performed which are expected to be suitable in describing user movements which are expected to be encountered when the user is engaged with different applications of a body joint tracking system. In another approach, the movements are specific to a particular application, such as a game. For instance, an interactive tennis game may have prescribed movements such as swinging a racket. Optionally, the actor can hold a prop in his or her hands during a movement.

Each sequence is comprised of successive frames, and each frame identifies the positions of markers on the actor's body. Each sequence can be performed based on a script. For instance, one script can specify specific arm and leg movements. One or more sequences can be obtained.

At step 602, for each frame in the sequence, a data set of 3-D coordinates of markers is provided. As mentioned, the exact location of each marker can be determined by triangulation using different cameras in the motion capture studio. Step 604 outputs one or more data sets of motion capture sequences.

In an example implementation, N motion capture sequences are captured, denoted $\{S_i | i=1 \ldots N\}$. Each sequence comprises frames $S_i = \{F_{it} | t=1 \ldots N_i\}$. Thus, $S_i$ represents a sequence or set of frames, and the object that it contains is $F_{it}$. Each $F_{it}$ is a vector of 3-D point positions or a vector of joint angles, and represents a frame (F) for sequence $S_i$ at time t. Each frame is represented by a set of M marker positions, so $F_{it}$ is represented by an M×3 matrix, with each row encoding the 3-D position of a marker. Note that N and each of the $N_i$ denote distinct variables. $N_i$ is the number of frames in sequence $S_i$.

FIG. 7a provides further details of performing retargeting and dissimilar pose detection (step 502 of FIG. 5), where retargeting is performed first. In one approach, each motion capture frame is retargeted to a number of different body types. The retargeting begins at step 700. Step 702 selects a sequence from the data set of motion capture sequences from step 606 of FIG. 6. Step 704 selects a frame from the current sequence. Step 706 selects a body type.

Step 708 translates the 3-D marker positions to joint positions based on the selected body type. The joint positions, which are part of a skeletal model of a body of the specified type, can be obtained based on the locations of the markers. For example, when one or more markers are positioned on the actor in a known location relative to the shoulder, the location of a joint which represents the shoulder can be determined from the marker positions. Further, the location of the joint in the body of the specified type can be determined based on a model of the body and a corresponding skeleton which fits that body model. Random variations, such as based on bone or limb length, can be added during step 708 as well.

In an example implementation, the input skeleton sequence is retargeted to one or more body shapes, numbered 1 ... B, producing retargeted frames $\{F'_{itk} | k=1 \ldots B\}$. $F'_{itk}$ is a frame in motion capture sequence $S_i$ at time t for body type k. The range of body shapes can be chosen to cover a large proportion of potential users of the system, and could include variations in: gender (male, female), age (adult, child), body type (specified weights such as 100 pounds, 150 pounds and 200 pounds; or fat, thin or average build), height (e.g., 5 feet, 5.5 feet, six feet), head hair type (mustache, beard, long/short hair), clothing (baggy, tight, skirt), and so forth. For instance, body type 1 may be a male, adult, weighing 150 pounds, 5.5 feet tall, with short hair and baggy clothing, body type 2 may be a male, adult, weighing 200 pounds, 6 feet tall, with long hair and tight clothing, and so forth.

This stage may optionally include adjustment of untracked joints, such as finger angles. The body model used for rendering has many more parameters (joint angles) than the input skeletons, so for most of those untracked joints one does not have information as to where they are. To fill in this information, one can set a default value (e.g., set the finger angles to correspond to an open hand). Alternatively, each rendered image can have these values set randomly, thus generating more variation in the renderings. One knows where those fingers are because one knows where the hand is (since it is a tracked joint) and one can use a kinematic model of the human skeleton and how fingers are related to hands, given finger orientations.

In one instantiation, fifteen base skeletons are used, with random variation in weight and/or bone or limb length. Thus B is effectively very large, but a random subset of all possible $F'_{itk}$ can be considered. See FIG. 12 for further details of a skeleton of a body model. Step 710 adds the retargeted frame to a data set of retargeted frames.

The joint positions in the skeletal model can be identified by (x,y,z) coordinates, in a first joint location identification scheme. An example skeleton can have about forty joints. The data set can include a matrix for each frame, where each row represents a particular joint in a skeletal model, and there are three columns which represent the (x,y,z) position of the joint in a coordinate system: a first column for x, a second column for y and a third column for z. The joints can be identified, e.g., such that the left shoulder is joint #1, the right shoulder is joint #2 and so forth.

In a second joint location identification scheme, the skeletal model can be defined by specifying a starting point, along with a series of joint angles and shape parameters, such as bone or limb lengths. For instance, a joint can be a specified distance along a vector from a given point. In this case, the data set can include a matrix for each frame, where a first row represents a starting joint, and each additional row represents a neighboring joint in the skeletal model. In this case, there can be four columns. The first three columns represent an angle of a vector from the prior joint to the current joint, e.g., in each of the x-y, y-z, x-z planes, respectively. The fourth matrix column can provide the shape parameter, such as the distance from the prior joint to the current joint, e.g., a bone length. Other joint identification schemes may be used as well.

A translation between the joint location identification schemes can be made. For example, translation from the first to the second joint location identification scheme can involve subtracting two successive joint positions in 3-D space to obtain a vector between them, in terms of angles in each of the x-y, y-z, x-z planes, and a magnitude of the vector as the shape parameter. Translation from the second to the first joint location identification scheme can involve addition of the vector defined by the angles and magnitude between two successive joint positions.

At decision step 712, if there is a next body type, the process at steps 706-710 is repeated for the current frame. If the current frame has been retargeted to all body types, then decision step 712 is false, and decision step 714 determines if there is another frame in the current sequence to process. If decision step 714 is true, then a new frame is selected at step 704 and the process at steps 706-710 is repeated for the new frame. If all frames in the current sequence have been retargeted, then decision step 714 is false and decision step 716 determines if there is another sequence to process. If there is another sequence to process, then a new sequence is selected at step 702 and the process of steps 704-710 is performed. When the last sequence has been processed, decision step 716 is false, and retargeting ends, at step 718. Step 720 outputs a data set of retargeted frames.

Dissimilar pose selection begins at step 722. In the space of all possible poses, the dissimilar pose selection provides a sparse sampling. As a result, fewer frames are provided to the learning algorithm, so that its computational expense is reduced, but without losing a significant amount of quality. For example, the number of frames may be reduced by an order of magnitude.

In the approach depicted, dissimilar pose detection is performed using the joint locations in the skeletal models used in retargeting rather than positions of the markers from the motion capture sequences. Step 724 selects and removes a pose from the data set of retargeted frames, provided at step 720. Step 726 adds the pose to a new data set of selected dissimilar poses. Step 728 determines a distance between each selected dissimilar pose and all of the remaining poses in the data set of retargeted frames, which are the candidate poses. Step 730 optionally excludes the candidate poses which are not at least a threshold distance T away from any selected dissimilar pose. These candidate poses are deemed to be too similar to the selected dissimilar pose or poses. Step 732 determines which candidate pose has a largest minimum distance to any selected dissimilar pose. Thus, for each candidate pose, one can determine its distance from each of the selected dissimilar poses. One then take a minimum of those distances for each candidate pose. Then, one determines which of the minimums is largest among all candidate poses. At step 734, the selected candidate pose is added to the data set of selected dissimilar poses and removed from the data set of retargeted frames. If there is a next frame to process from the data set of retargeted frames, at decision step 736, then processing continues at steps 728-734. In one approach, decision step 736 is false when a specified number D of frames have been provided in the data set of retargeted, dissimilar frames. The dissimilar pose detection ends at step 738. Step 740 outputs a data set of selected dissimilar frames. The dissimilar poses are a subset of poses in the retargeted motion capture sequences FIG. 7*b* depicts an algorithm for dissimilar pose selection. Associating each tuple (i, t, k) with an integer r, all retargeted motion capture frames are represented as the set $S'=\{F'_r|r=1 \ldots R\}$, where $R=B \times \Pi \ N_i = B \times N_1 \times \ldots \times N_N$. The goal of dissimilar pose selection is to choose a subset (of size D) of these frames, represented by the set of integers $P_I=\{r_1, \ldots, r_D\}$, such that the subset does not include pairs of frames which are similar, as defined by a similarity function $\phi$, which may also be considered to be a distance metric. This function (examples are given below) maps a pair of frames from S' to a positive real number which is low for similar frames, and high otherwise. For clarity, if the frames are represented by M×3 matrices G and H, then $\phi(G,H)$ returns the similarity of G and H, with $\phi=0$ for identical poses and larger $\phi$ denoting less similar poses. Pseudocode for the algorithm is in FIG. 7*b* The output indices $P_I$ define a set of motion capture frames P which are the input to subsequent stages. If dissimilar pose detection is not performed, then P':=S'. Alternatively, dissimilar pose selection may be run on the motion capture frames prior to retargeting (see FIG. 7*c*).

The dissimilar pose detection algorithm uses the pose similarity function $\phi(G,H)$. Given matrix G, denote its M rows by $\{g_j\}_{j=1:M}$, and similarly denote the rows of H by $\{h_j\}_{j=1:M}$. A first possible definition of similarly is the maximum joint distance $$\phi(G, H) := \max_j \|g_j - h_j\|_2^2.$$

The squared Euclidean distance is depicted. A second possible definition used is the sum of squared distances: $\phi(G, H):=\Sigma_{j=1}^{M}\|g_j-h_j\|_2^2$. A range of alternative distance functions can readily be defined. For example, in the dissimilar pose selection, different parts of the body can be weighted differently. For instance, the weights can indicate that it is more important to have dissimilar hands than feet, in which case the joint distances involving the hand are weighted more heavily.

The distance metric and/or the threshold can be adjusted to achieved a desired number of dissimilar poses and a corresponding desired sampling sparseness.

FIG. 7*c* provides further details of performing retargeting and dissimilar pose detection (step 502 of FIG. 5), where dissimilar pose detection is performed first. In one possible approach, dissimilar pose detection is performed using the positions of the markers from the motion capture sequences, rather than joint locations in the retargeted skeletal models. Furthermore, since retargeting to multiple body types has not yet been performed, there are fewer frames to use in the comparison process, so it is less computationally expensive. An advantage of retargeting first is that possibly certain dissimilar poses look very similar in different characters so this may be wasteful.

Dissimilar pose selection begins at step 750. Step 752 selects and removes a pose from the data set of motion capture sequences, provided at step 606 of FIG. 6. Step 754 adds the pose to a new data set of selected dissimilar poses. Step 756 determines a distance between each selected dissimilar pose and all the remaining poses in the data set of motion capture sequences, which are the candidate poses. Optional step 758 excludes the candidate poses which are not at least a threshold distance T away from a selected dissimilar pose. Step 760 determines which candidate pose has a largest minimum distance to a selected dissimilar pose. Step 762 adds the candidate pose to the data set of selected dissimilar poses and removes the candidate pose from the data set of motion capture sequences. If there is a next frame to process from the data set of motion capture sequences, at decision step 764, then processing continues at steps 756-762. In one approach, decision step 764 is false when a specified number of frames have been provided in the data set of dissimilar frames. The dissimilar pose detection ends at step 766. Step 768 outputs a data set of selected dissimilar poses, which have not yet been retargeted. The dissimilar poses are a subset (fewer than all) of poses in the retargeted motion capture sequences.

The retargeting begins at step 770. Step 772 selects a frame from the data set of selected dissimilar poses from step 720. Step 704 selects a frame from the current sequence.

Step 774 selects a body type. Step 776 translates the 3-D marker positions to joint positions based on the selected body type, as discussed previously. Random variations, such as to limb length, can be added during step 776 as well. Step 778 adds the retargeted frame to a data set of retargeted, dissimilar frames.

At decision step 780, if there is a next body type, the process at steps 774-778 is repeated for the current frame. If the current frame has been retargeted to all body types, then decision step 780 is false, and decision step 782 determines if there is another frame in the data set of dissimilar frames to process. If decision step 782 is true, then a new frame is selected at step 772 and the process at steps 774-778 is repeated for the new frame. If all frames in the data set of dissimilar frames have been retargeted, then decision step 782 is false and retargeting ends, at step 784. Step 786 outputs a data set of retargeted, dissimilar frames.

In FIGS. 7a and 7c, it is possible but not necessary to retarget all combinations of body type for all frames. Instead, for instance, for each frame, the body types used for retargeting can be randomly chosen. Also, not all frames need to be retargeted. Instead, for instance, frames can be randomly chosen for retargeting. A random selection may be made of both frames and body types as well. Further, the techniques for identifying dissimilar poses as described herein can be modified to identify different groups of similar poses, and to provide a representative pose from each group while discarding the other, too-similar poses in the group.

FIG. 8 provides further details of performing rendering to provide depth images and classification images (step 504 of FIG. 5). One the retargeted, dissimilar frames have been provided, each frame is rendered to a depth image, classification image and text file. That is, given a set P of motion capture frames, or poses, the next process is to render the poses. This step comprises, for a given pose, choosing a collection of 3-D scene geometry, placing the 3-D body model corresponding to the pose within the 3-D scene, choosing one or more camera positions within the scene, and then generating, for each of many combinations of pose, camera position, and body model position, a pair of images comprising a rendered depth image (see FIG. 15a), where each pixel encodes distance from the virtual camera to the 3-D scene or body model, or is encoded as background. The pair of images also includes a rendered classification image (see FIG. 15b), where each pixel contains an integer encoding the number of the body part which was nearest the camera at that pixel, or a unique index of a 3-D body model. The body parts are defined using a texture map applied to the object, while scene geometry objects such as the ground plane are given unique indices in the classification image. Some items of the body model may be rendered in separate layers, for example a skirt or hair. Rather than coloring these with their own unique color, a new set of indices is defined to represent "hair plus top of head", "hair plus left of head", "hair plus shoulder" and so forth in the classification image. Noise can be added more easily to an object which is rendered to a separate layer.

Step 800 includes selecting a frame from the data set of retargeted, dissimilar frames.

Step 802 provides a 3-D body model corresponding to the selected frame, or more specifically, corresponding to the skeletal model and its pose in the selected frame. Step 804 applies a texture map to the 3-D body model, where the texture map includes different regions for different body parts, and each region is assigned an index or number. See FIG. 14 for further details.

Step 806 selects a virtual camera position in the scene. The camera positions for each rendered pair of depth image and classification image can be parameterized by parameters such as the camera height above ground, the camera look direction (pan and tilt), or camera angle, and the camera field of view, or even be aimed at the body position to ensure the person is in the field of view.

Step 808 selects a body position. Generally, the body model position can be parameterized by the (x,z) position on the virtual ground plane, and rotation about the y-axis, perpendicular to the ground plane. The z axis denotes an axis of the depth from the virtual camera, the y-axis extends vertically, and the x-axis denotes a left-to-right direction parallel to the ground plane and perpendicular to the y and z-axes. Note that not all possible combinations of camera position, scene geometry, and body model position need be rendered. For some training scenarios, random variations in one or more of the parameters will suffice. These parameters are also chosen to ensure the character lies at least partially in the field of view of the camera.

Optionally, 3-D scene elements, also referred to as scene geometry objects, can be provided at step 810. Step 812 provides a unique index for each scene geometry object. Regarding a choice of scene geometry, the rendered body model can be placed in a 3-D scene model. Possible scene models include: (1) an empty scene, where only the body model appears in the rendered frames, (2) ground plane, where a plane geometry element is placed in the model, and appears under the model in the rendered frame, and (3) a general scene, where 3-D elements such as walls, furniture such as a couch, chair, or coffee table, plants, pets, other household objects, or objects which may be handheld or worn by a user while interacting with a body joint tracking system, such as a tennis racket or basketball, may be obtained and positioned in the synthetic scene. Collision detection is used to ensure that the rendered body is positioned so as to avoid unrealistic intersections with the scene geometry. Objects may be placed in front of and/or behind the body.

As an example, the actor in the motion capture sequence may pose in a position as if sitting on a couch. In this case, a couch as a scene object can be inserted in the depth image with the body model which corresponds to this pose, so that the body model appears to be sitting on the couch. Thus, one can tailor the position of the couch or other scene element to the body pose. This provides a realistic depth image which can be used to train the learning algorithm for this common scenario. Different types (style/size) of couches could be used as well. Note that some the scene elements can be tailored to the body pose, and/or provided commonly for all poses.

Based on these steps, a depth image comprising pixels is rendered. Specifically, a pixel which represents a 3-D body part is encoded with a distance from a virtual camera to the 3-D body (step 816). A pixel which represents a 3-D scene object is encoded with a distance from the virtual camera to the 3-D scene object (step 818). A pixel which represents a background region is encoded as a background pixel, e.g., using a designated color which contrasts with the pixels of the 3-D body and scene objects (step 820). A corresponding classification image can be rendered by encoding a pixel which represents a 3-D body part with a number of the body part which is closest to the virtual camera (step 822). A separate color can be assigned for each body part. In some cases, one part of the body (e.g., an arm) can be in front of another part (e.g., the torso), in which case the closer part is identified. At step 824, a pixel which represents a 3-D scene object can be encoded with a unique index of the object. As an example, the resolution of the output depth and classification images can be 640×480 pixels. The resolution should be similar to the resolution of the real world depth camera which is being trained. A text file of pose data can also be provided a step 814.

Other options include extending the set of poses by combining joint angles or positions from two or more original motion capture frames, such as taking the lower body joints from one frame and the upper body joints from another frame. Thus, the rendering could combine portions of two or more 3-D body models in different poses but with a common virtual camera position and common 3-D scene elements.

Figure 9:
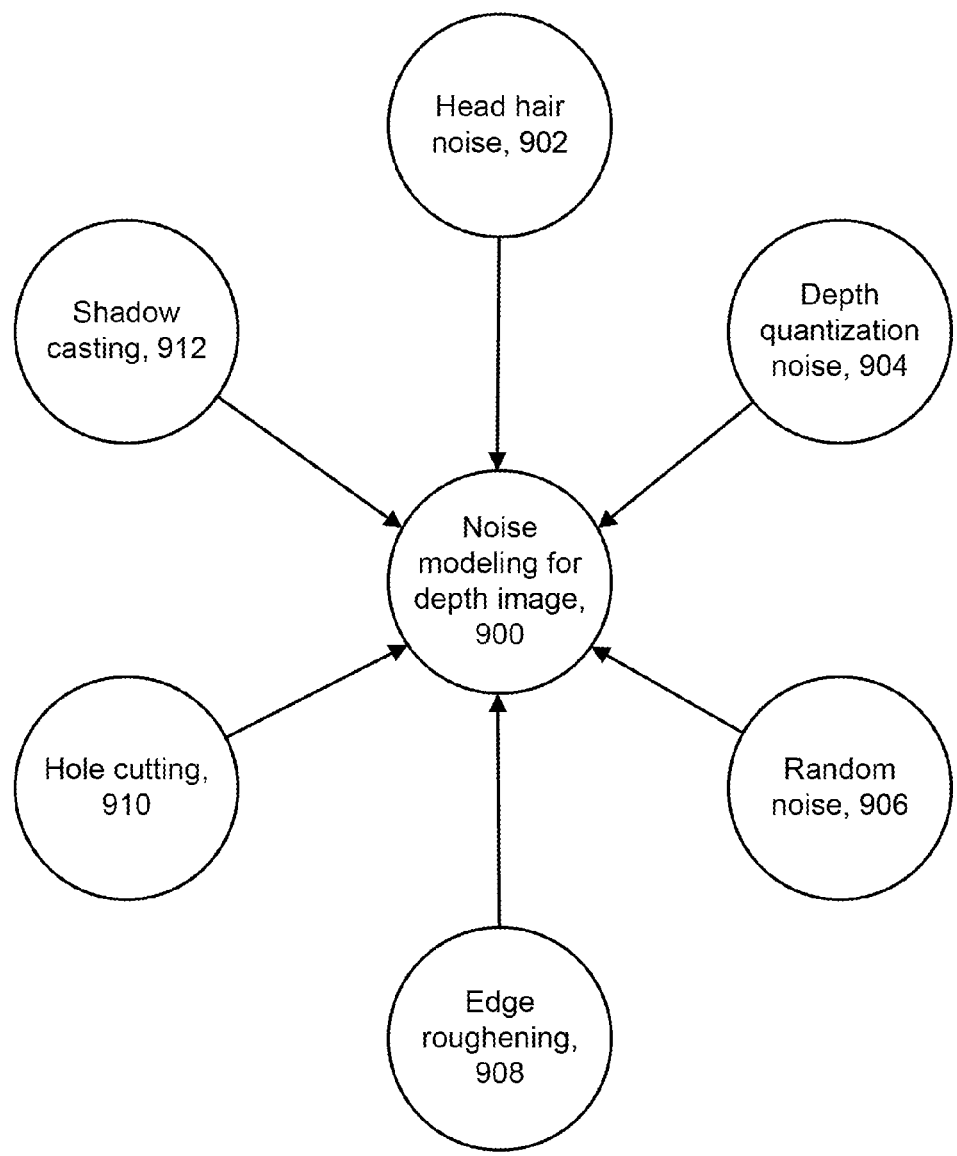
FIG. 9 provides further details of adding noise to depth images (step 506 of FIG. 5).

FIG. 9 provides further details of adding noise to depth images (step 506 of FIG. 5). In simulating the imaging process of a real depth camera, for the rendered depth images or maps to be most useful for training, noise can be added to make the depth images appear similar to those that would be obtained from the real-world camera. To this end, one or more of a number of processes can be applied to the rendered depth image to make it a more accurate simulation of the image that will be obtained by a real-world camera.

In FIG. 9, noise modeling for a depth image (900) can be based on one or more of head hair noise (902), depth quantization noise (904), random noise (906), edge roughening (908), hole cutting (910) and shadow casting (912).

Regarding hair noise simulation (902), a particular characteristic of some cameras is that body hair (e.g. scalp hair, moustaches and beards—collectively "head hair") may not be imaged reliably. To simulate the presence of head hair, a certain proportion of the rendered pixels which are classified as head hair can be randomly deleted, and replaced with the background label in the depth map, and the background class in the classification map. The deleted pixels can be those within a specified radius of some fraction of the hair pixels. For instance, referring to the classification image of FIG. 14, regions 1402 and 1430 may denote the scalp. A number of pixels in the depth map will represent each region. In each region, a subregion which consists of a fraction of the pixels can be defined, e.g., 10%, 20%, 30% or so forth. Pixels within a specified radius of, e.g., 1, 2, 3, or 4 pixels, of this subregion, along with the pixels within the subregion. As another example, regions 1406 and 1434 of FIG. 14 may denote a beard region where pixels can be deleted.

Regarding depth quantization noise (904), the rendered images contain high resolution depth information, higher than the depth resolution of the real world camera. To simulate the effect of the camera, this resolution can be quantized to one of several discrete levels, with a precision dependent on depth (less precision with greater depth). As one example, depths between 0 and 1 meters are quantized to a 5 mm increment; 1 and 2 meters to a 21 mm increment; and so on, with depths 3 to 3.5 meters quantized to a 65 mm increment.

Regarding the random noise (906), to simulate random noise in the camera, noise can be added to each non-background pixel in the rendered depth image. A non-background pixel can be a pixel that does not represent the 3-D body (step 816) or a 3-D scene element (step 818). The noise can be drawn from a uniform distribution over [−N,N] where N is a preset noise level. The noise is added to the inverse depth, so that for pixel (i, j), with depth z, the new depth, with added noise, is given by $$z_{noisy} = \frac{1}{\frac{1}{z} + N\eta}$$

where η is a draw from a uniform distribution in the range (−1 . . . 1).

Regarding edge roughening (908), depth information is less reliable near large discontinuities in the depth image. A process called "edge roughening" is applied in order to simulate this effect. In one approach, points in the depth image whose neighboring pixels are significantly (e.g., 10 cm) further from the camera are marked as "edges." Such edges are also marked as "East"/"West" etc. according to the direction of the farther pixel with respect to the center. Thus, a "West" edge represents a sharp decrease in depth as one travels from the left to the right of the image. For each such edge point, the value at the point is replaced at random by the depth of a neighboring pixel, chosen from the farther surface (the surface with greater depth). For example, if an edge is a sequence of edge points (corresponding to one per pixel along the edge), then a given edge will have a random subset of its pixels replaced. So one edge might have 2 pixels replaced, another edge might have no pixels replaced and so forth.

Thus, the noise is added by identifying first and second edges in one of the dissimilar poses having a depth discontinuity greater than a threshold, and replacing pixels between the first and second edges with background pixels.

Regarding hole cutting (910), another characteristic of the sensor in the real world depth camera which it may be desired to emulate is the property that "thin" structures (say narrower than 4 pixels in the image) may not be detected at all. Such structures can be detected by locating complementary (e.g. West, then East; or North, then South) edges within this distance, and replacing the intervening values with background.

Regarding shadow casting (912), another sensor characteristic which can be modeled is the casting of shadows. Shadows occur when a nearer part of the scene occludes a farther part, preventing the depth camera from reporting an accurate depth. For example, the near part could be an arm in front of the other arm (e.g., making an "X" with the forearms). Shadows are associated with "West" edges whose depth discontinuities are greater than a threshold slope. The shadow casting process locates such edges in the depth image, finds the east most point which satisfies the slope threshold, and replaces pixels between the edge and the east most point with background. This example applies to a scenario in which shadows form only for vertical edges, because of the camera geometry, with the IR emitter left of the IR camera. The example can be modified for other camera geometries.

FIG. 10a depicts an alternative view of the process of FIG. 5, where retargeting is performed before dissimilar pose detection. Here, motion capture data (1000) undergoes retargeting (1002) to provide body pose data (1004). The body pose data undergoes dissimilar pose detection (1006) to provide unique or sufficiently dissimilar poses (1008). The unique poses undergo rendering (1010) to provide depth maps (1012), classification maps (1014) and position information files (1016). Noise synthesis (1018) is optionally added to the depth maps. The result of each step is provided to a machine learning algorithm (1020), which represents the supervised learning algorithm.

FIG. 10b depicts an alternative view of the process of FIG. 5, where retargeting is performed after dissimilar pose detection. Here, motion capture data (1050) undergoes dissimilar pose detection (1052) to provide unique or sufficiently dissimilar poses (1054). The unique poses undergo retargeting (1056) to provide body pose data (1058). The body pose data undergoes rendering (1060) to provide depth maps (1062), classification maps (1064) and position information files (1066). Noise synthesis (1068) is optionally added to the depth maps. The result of each step is provided to the machine learning algorithm (1070).

Figure 11A:
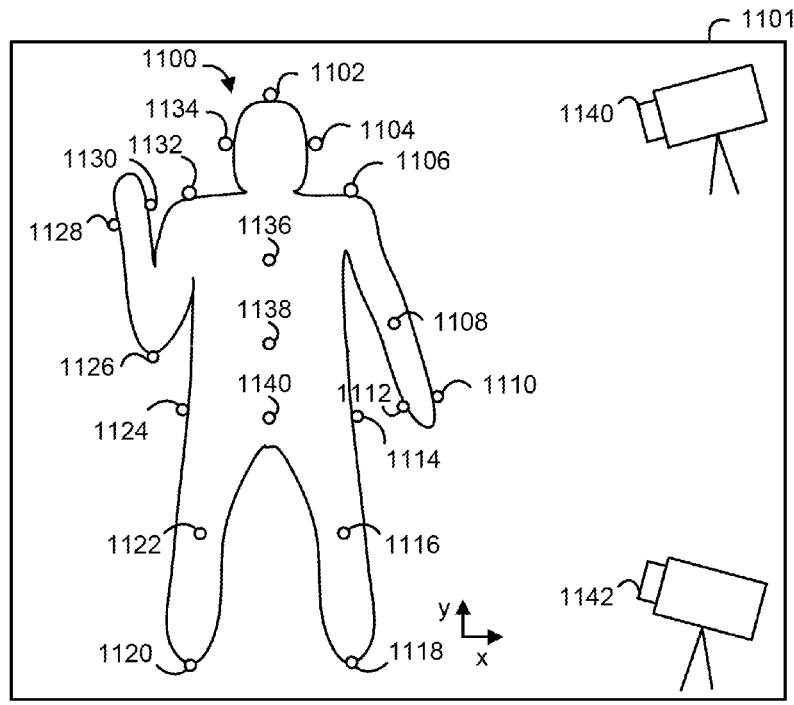
FIG. 11a depicts an example view of a first pose of an actor with markers in a motion capture studio (step 500 in FIG. 5).

FIG. 11a depicts an example view of a first pose of an actor with markers in a motion capture studio (step 500 in FIG. 5). In a simplified view of a motion capture studio, depicted by rendering 1101, multiple cameras 1140, 1142 image an actor who is wearing markers. The actor is in a first pose, as depicted by rendering 1100. The markers are located at: top of head (1102), right side of head (1104)—referring to the right side in image space—right shoulder (1106), right elbow (1108), right wrist (1110 and 1112), right hip (1114), right knee (1116) and right foot (1118). Other markers are located at: left side of head (1134)—referring to the left side in image space—left shoulder (1132), left elbow (1126), left wrist (1128 and 1130), left hip (1124), left knee (1122) and left foot (1120). Other markers are located at: lower torso (1140), middle torso (1138) and upper torso (1136). Axes in the x and y direction are depicted. These can correspond to the x and y directions in FIG. 1.

Figure 11B:
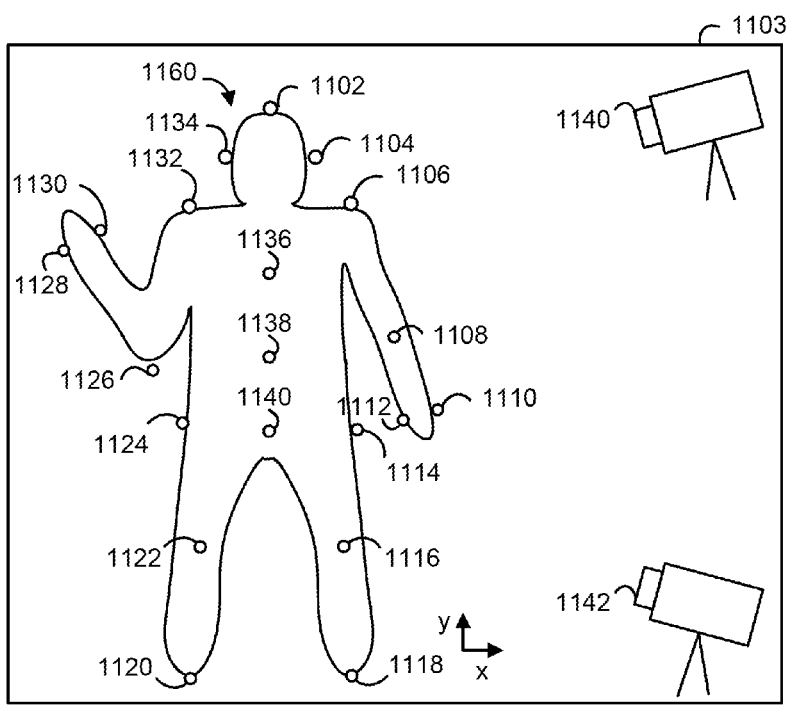
FIG. 11b depicts an example view of a second pose of an actor with markers in a motion capture studio (step 500 in FIG. 5).

FIG. 11b depicts an example view of a second pose of an actor with markers in a motion capture studio (step 500 in FIG. 5). In this rendering 1103 of the motion capture studio 1103, the same actor is in a second pose, depicted by rendering 1160.

Figure 12:
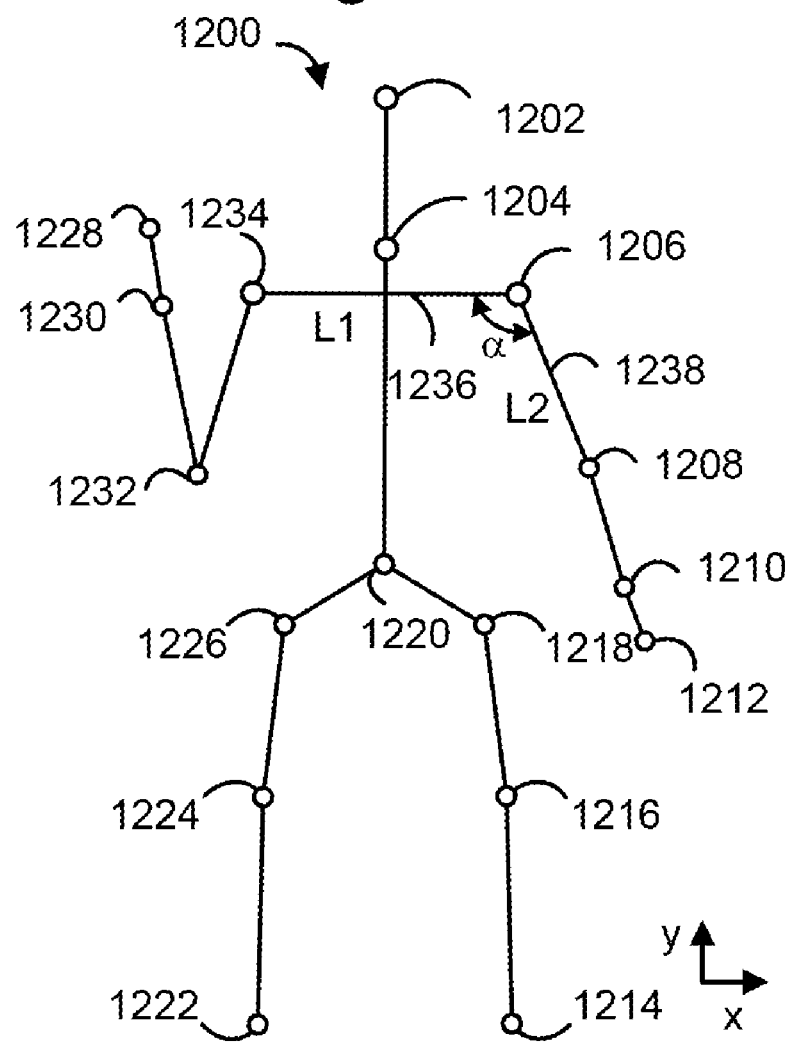

FIG. 12 depicts an example of joint locations in a skeleton derived from the pose of the actor of FIG. 11a. The skeleton 1200 includes the following joints/points: head (1202), neck (1204), right shoulder (1206), right elbow (1208), right wrist (1210), right hand (1212), lower torso (1220), right thigh (1218), right knee (1216) and right foot (1214). The skeleton 1200 also includes: left shoulder (1234), left elbow (1232), left wrist (1230), left hand (1228), left thigh (1226), left knee (1224) and left foot (1222). As mentioned, each joint or point can be identified along with its position. The position can be identified by an absolute (x,y,z) location, or by a starting point and a series of joint angles and distances. For example, the left shoulder 1234 could be a starting point, where the right shoulder is defined as being a distance L1 from the left shoulder (none 1236). Assuming the shoulder line as a vector between joints 1234 and 1206 extends directly in the x-direction, with no component in the y or z directions, the position of joint 1206 relative to the position of joint 1234 can be described by angles of (0,0,0) in the (x-y, x-z, y-z) planes, and by the length L1. As a further example, the position of the right elbow joint 1208 relative to the right shoulder joint 1206 can be described by the angles of ($\alpha$,0,0) in the (x-y, x-z, y-z) planes, and by the length L2, which is the distance between the right elbow joint 1208 and shoulder joint 1206 (bone 1238). In this simplified example, joints 1206 and 1208 are both assumed to be in the x-y plane.

Figure 13A:
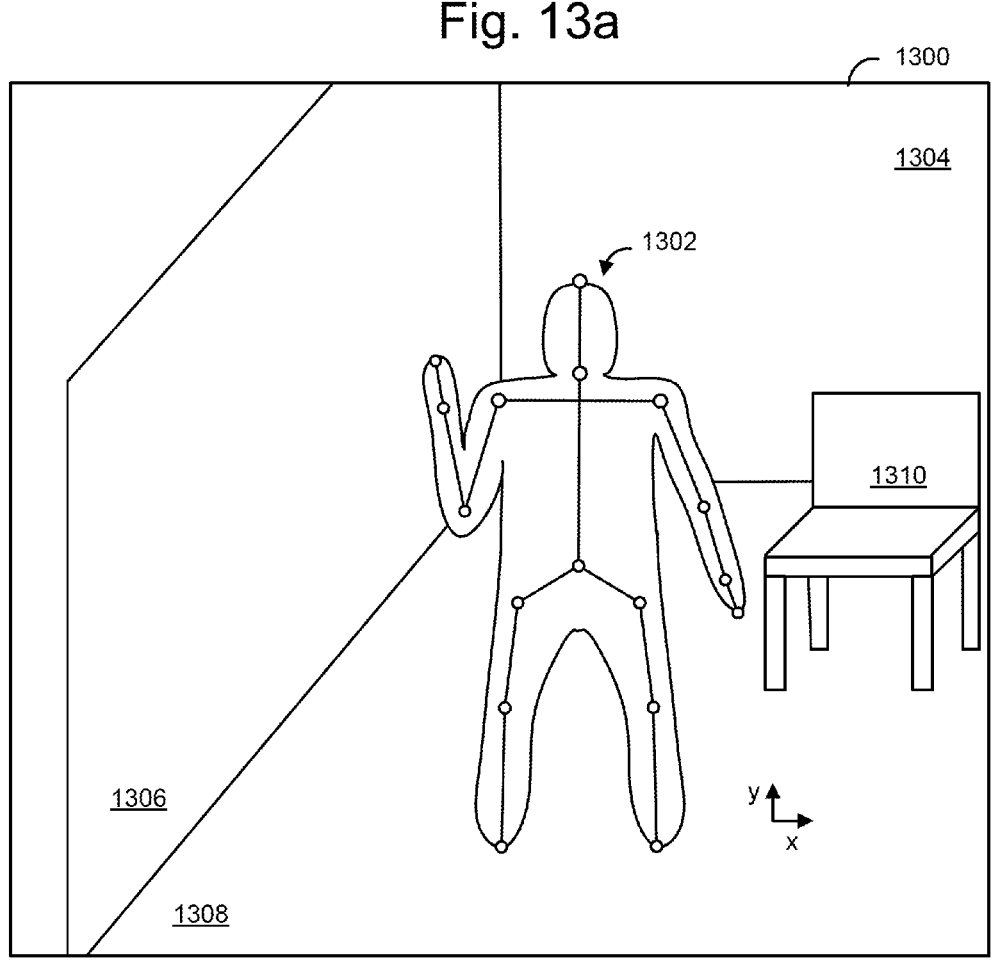
FIG. 13a depicts a rendering of a depth image of a 3-D body, of a first body type, with an overlay of the corresponding skeleton of FIG. 12, along with 3-D scene elements.

FIG. 13a depicts a rendering of a depth image of a 3-D body, of a first body type, with an overlay of the corresponding skeleton of FIG. 12, along with 3-D scene elements. The depth image 1300 includes the rendered 3-D body model 1302. The skeleton is not rendered in the depth image, but is shown here to indicate how the body corresponds to the skeleton. As mentioned, different body types will correspond to different skeletons. 3-D scene elements or objects include a ground place or floor 1308, a side wall 1306, a back wall 1304 and a chair 1310.

Figure 13B:
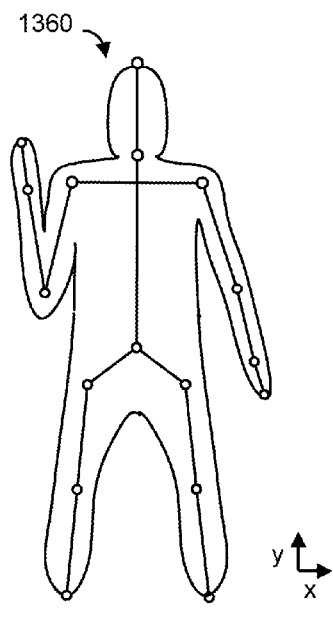
FIG. 13b depicts a rendering of a depth image of a 3-D body 1360, of a second body type, with an overlay of a corresponding skeleton.

FIG. 13b depicts a rendering of a depth image of a 3-D body 1360, of a second body type, with an overlay of a corresponding skeleton. The body 1360 is a thinner, smaller body type than the body 1302 in FIG. 13a.

Figure 14:
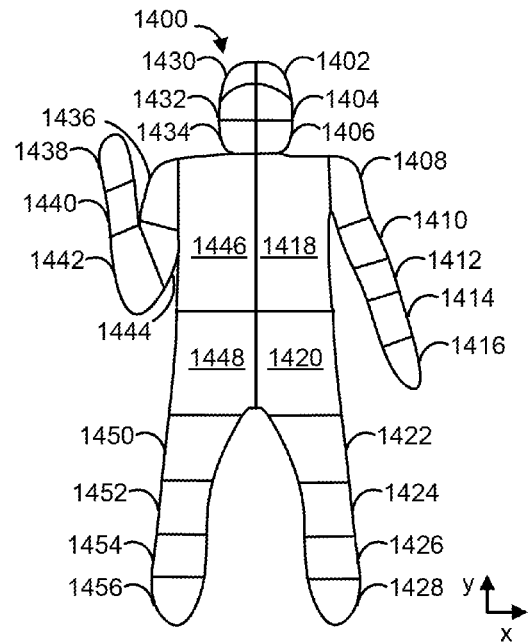

FIG. 14 depicts a classification image corresponding to the 3-D body of FIG. 13a. As mentioned in step 822 of FIG. 8, each body part in the classification image can be assigned an identification number. A unique color can also be assigned to each body part. The regions in the body 1400 are obtained by applying a texture map to a body model. Example body regions include, on the right side, in image space: scalp (1402), upper face (1404), lower face (1406), shoulder (1408), upper arm (1410), elbow (1412), lower arm (1414), hand (1416), upper torso (1418), lower torso (1420), thigh (1422), knee (1424), lower leg (1426) and foot (1428). Example body regions include, on the left side, in image space: scalp (1430), upper face (1432), lower face (1434), shoulder (1436), upper arm (1444), elbow (1442), lower arm (1440), hand (1438), upper torso (1446), lower torso (1448), thigh (1450), knee (1452), lower leg (1454) and foot (1456).

FIG. 14, which uses several body parts, is only an example. Any other pattern or number (>=2) of body parts is also possible.

Figure 15A:
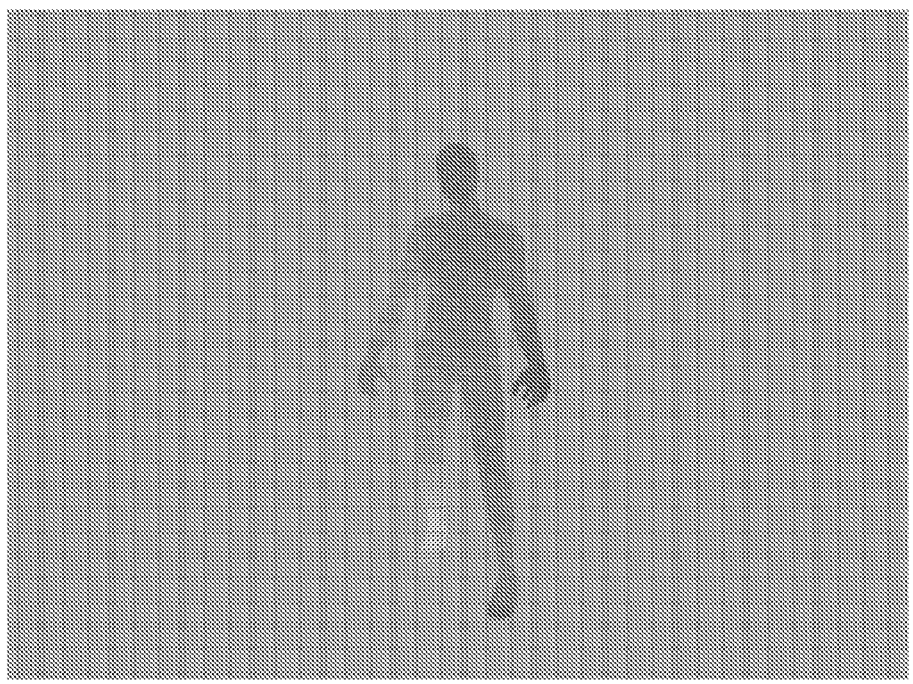
FIG. 15a depicts an example depth image.

FIG. 15a depicts an example depth image. The depth image may include shades of grey to represent the depth, with a lighter color representing a greater depth from the virtual camera. These shades of grey can be calibrated to real physical units. For example, a grey value of 100 can mean 100 mm=0.1 m, and a grey value of 2500 (in a 16 bit per pixel depth image) can mean 2500 mm=2.5 m. The background can be given a grey value of 0.

Figure 15B:
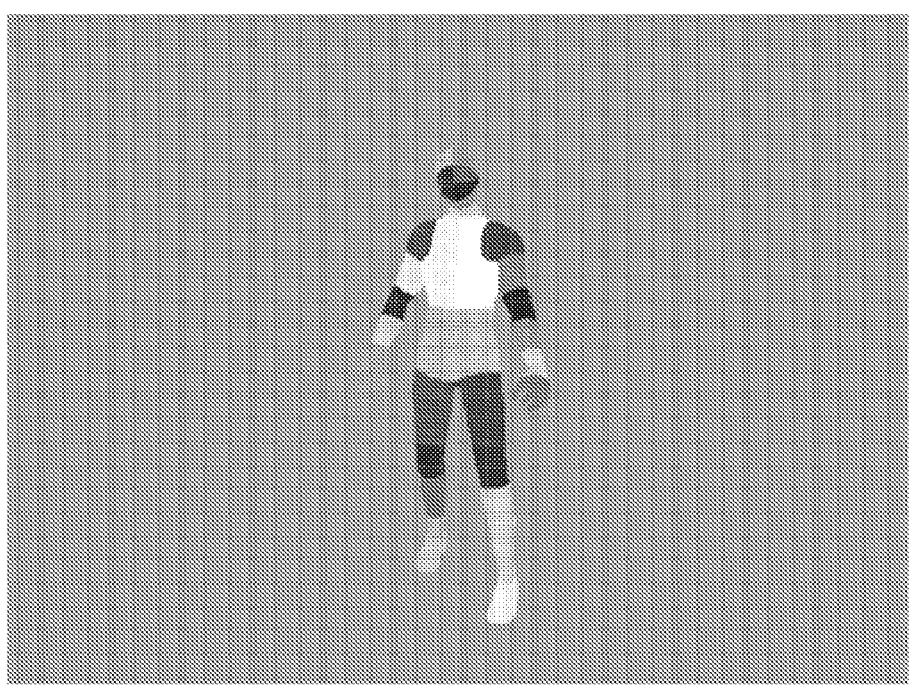

FIG. 15b depicts an example classification image corresponding to the depth image of FIG. 15a. The classification image includes several regions corresponding to those in FIG. 14. Each region can be rendered in a different color.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen to best explain the principles of the technology and its practical application to thereby enable others skilled in the art to best utilize the technology in various embodiments and with various modifications as are suited to the particular use contemplated. It is intended that the scope of the technology be defined by the claims appended hereto.

We claim:

1. A processor-implemented method for generating proxy training data for human body tracking, comprising the processor-implemented steps of:

accessing at least one motion capture sequence which identifies poses of an actor's body during a time period in which the actor performs a movement;

performing retargeting to a plurality of body types and dissimilar pose selection, based on the at least one motion capture sequence, to provide a plurality of dissimilar poses; and rendering each of the dissimilar poses according to a 3-D body model for a respective body type of the plurality of body types, to provide a respective depth image of the dissimilar pose, and to provide a respective classification image which identifies body parts of the dissimilar pose, where a plurality of 3-D body models are used, one for each body type, and the respective depth image and the respective classification image comprise pixel data which is usable by a machine learning algorithm for human body tracking.

2. The processor-implemented method of claim 1, wherein:

the retargeting retargets the at least one motion capture sequence to the plurality of body types, to provide a plurality of retargeted motion capture sequences, each retargeted motion capture sequence identifies poses for a respective body type of the plurality of body types; and the dissimilar pose selection selects the dissimilar poses from the plurality of retargeted motion capture sequences, such that the dissimilar poses are a subset of poses in the plurality of retargeted motion capture sequences.

3. The processor-implemented method of claim 1, wherein:

the dissimilar pose selection selects the dissimilar poses from the at least one motion capture sequence, such that the dissimilar poses are a subset of poses in the at least one motion capture sequence; and the retargeting retargets the dissimilar poses to the plurality of body types, to provide a plurality of retargeted motion capture sequences, each retargeted motion capture sequence identifies poses for a respective body type of the plurality of body types.

4. The processor-implemented method of claim 1, further comprising the process-implemented step of:

introducing a variation comprising at least one of a varied bone length and a varied joint angle into at least one of the dissimilar poses.

5. The processor-implemented method of claim 1, wherein:

the 3-D body model is rendered based on at least one of joint positions and joint angles of a corresponding skeleton.

6. The processor-implemented method of claim 1, wherein:

the rendering adds 3-D scene elements to at least one of the dissimilar poses; and at least one of the 3-D scene elements is tailored to a corresponding body pose of the dissimilar poses.

7. The processor-implemented method of claim 6, further comprising the process-implemented step of:

extending the poses of the actor's body to at least one additional pose by combining joint angles from two or more motion capture frames of the at least one motion capture sequence.

8. The processor-implemented method of claim 1, wherein:

the plurality of body types include variations in gender, age, body type, hair and clothing.

9. The processor-implemented method of claim 1, wherein:

the rendering varies at least one of the dissimilar poses by varying at least one of a virtual camera height, a virtual camera angle and a virtual camera field of view.

10. The processor-implemented method of claim 1, wherein:

the rendering varies at least one of the dissimilar poses by varying a body position for the at least one of the dissimilar poses.

11. The processor-implemented method of claim 1, wherein:

the rendering adds 3-D scene elements to at least one of the dissimilar poses; and the rendering combines two or more of the 3-D body models in different poses but with a common virtual camera position and common 3-D scene elements.

12. Tangible computer readable storage having computer readable software embodied thereon for programming at least one processor to perform a method for generating proxy training data for human body tracking, the method comprising:

accessing at least one motion capture sequence which identifies poses of an actor's body during a time period in which the actor performs a movement;

performing retargeting to a plurality of body types and dissimilar pose selection, based on the at least one motion capture sequence, to provide a plurality of dissimilar poses; and rendering each of the dissimilar poses according to a 3-D body model for a respective body type of the plurality of body types, to provide a respective depth image of the dissimilar pose, and to provide a respective classification image which identifies body parts of the dissimilar pose, where a plurality of 3-D body models are used, one for each body type, the respective depth image and the respective classification image comprise pixel data which is usable by a machine learning algorithm for human body tracking, and the rendering adds 3-D scene elements to at least one of the dissimilar poses.

13. The tangible computer readable storage of claim 12, wherein:

the 3-D scene elements include a ground place, background wall, ceiling and furniture.

14. The tangible computer readable storage of claim 12, wherein:

at least one of the 3-D scene elements is tailored to a corresponding body pose of the plurality of dissimilar poses.

15. A processor-implemented method for generating proxy training data for human body tracking, comprising the processor-implemented steps of:

accessing at least one motion capture sequence which identifies poses of an actor's body during a time period in which the actor performs a movement;

performing dissimilar pose selection and retargeting to a plurality of body types, based on the at least one motion capture sequence, to provide a plurality of dissimilar poses; and rendering each of the dissimilar poses according to a 3-D body model for a respective body type of the plurality of body types, to provide a respective depth image of the dissimilar pose, and to provide a respective classification image which identifies body parts of the dissimilar pose, where a plurality of 3-D body models are used, one for each body type, the respective depth image and the respective classification image comprise pixel data which is usable by a machine learning algorithm for human body tracking, and the rendering adds noise to at least one of the dissimilar poses.

16. The processor-implemented method of claim 15, wherein:

the noise is added by adding head hair to the at least one of the dissimilar poses.

17. The processor-implemented method of claim 15, wherein:

the noise is added by quantizing a depth resolution of the at least one of the dissimilar poses, with a precision dependent on depth.

18. The processor-implemented method of claim 15, wherein:

the noise is added by identifying at least one edge in the at least one of the dissimilar poses, and replacing a depth of at least one pixel at the at least one edge with a depth of a neighboring pixel further from the at least one edge.

19. The processor-implemented method of claim 15, wherein:

the noise is added by identifying at least one thin structure which is thinner than a specified number of pixels in the at least one of the dissimilar poses, and replacing pixels of the at least one thin structure with background pixels.

20. The processor-implemented method of claim 15, wherein:

the noise is added by identifying first and second edges in the at least one of the dissimilar poses having a depth discontinuity greater than a threshold, and replacing pixels between the first and second edges with background pixels.

* * * * *